(12) United States Patent
Yamada et al.

(10) Patent No.: US 9,623,671 B2
(45) Date of Patent: Apr. 18, 2017

(54) IMAGE PROCESSOR, PRINTING APPARATUS, AND IMAGE PROCESSING METHOD

(75) Inventors: Akitoshi Yamada, Yokohama (JP); Fumitaka Goto, Tokyo (JP); Tomokazu Ishikawa, Kawasaki (JP); Tohru Ikeda, Yokohama (JP); Nobutaka Miyake, Yokohama (JP); Makoto Torigoe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 12/966,823

(22) Filed: Dec. 13, 2010

(65) Prior Publication Data

US 2011/0285779 A1 Nov. 24, 2011

(30) Foreign Application Priority Data

May 24, 2010 (JP) .................................. 2010-118669

(51) Int. Cl.
*B41J 2/21* (2006.01)
*H04N 1/00* (2006.01)
*H04N 1/60* (2006.01)

(52) U.S. Cl.
CPC ........ *B41J 2/2146* (2013.01); *H04N 1/00015* (2013.01); *H04N 1/00034* (2013.01);
(Continued)

(58) Field of Classification Search
CPC .............................. H04N 1/6041; B41J 2/2146
(Continued)

(56) References Cited

U.S. PATENT DOCUMENTS 6,025,929 A 2/2000 Nakajima et al.
6,722,751 B2 * 4/2004 Barr et al. ...................... 347/19
(Continued)

FOREIGN PATENT DOCUMENTS

CN 1997099 A 7/2007
CN 101426072 A 5/2009
(Continued)

OTHER PUBLICATIONS

European Search Report dated Sep. 12, 2011 in corresponding European Application No. 11167252.3.
(Continued)

*Primary Examiner* — Manish S Shah
*Assistant Examiner* — Jeffrey C Morgan
(74) *Attorney, Agent, or Firm* — Fitzpatrick Cella Harper & Scinto

(57) ABSTRACT

An image processor, a printing apparatus, and an image processing method are provided that can reduce, when a plurality of types of inks are used to print an image, the color unevenness that is caused by the variation of ejecting characteristics among a pluralities of nozzles. To realize this, for a color formed by overlapping at least two colors of inks, parameters are prepared that are determined so as to reduce the color difference in the printing medium due to the variation of the ejecting characteristic among the respective pluralities of nozzles. During printing, the parameters are used to correct the first color signal owned by the individual pixels to the second color signal.

13 Claims, 11 Drawing Sheets

(52) U.S. Cl.
CPC ..... *H04N 1/00045* (2013.01); *H04N 1/00087* (2013.01); *H04N 1/6041* (2013.01); *H04N 2201/0082* (2013.01)

(58) Field of Classification Search
USPC .......................................................... 347/15
See application file for complete search history.

(56) References Cited

U.S. PATENT DOCUMENTS

| | | | |
|---|---|---|---|
| 6,980,326 | B2 | 12/2005 | Tsuchiya et al. |
| 7,016,530 | B2 | 3/2006 | Saito et al. |
| 7,034,844 | B2 | 4/2006 | Akiyama et al. |
| 7,075,679 | B2 | 7/2006 | Goto et al. |
| 7,079,152 | B2 | 7/2006 | Akiyama et al. |
| 7,266,239 | B2 | 9/2007 | Akiyama et al. |
| 7,274,491 | B2 | 9/2007 | Yamada et al. |
| 7,290,845 | B2 * | 11/2007 | Tanaka ............................ 347/15 |
| 7,342,684 | B2 | 3/2008 | Imafuku et al. |
| 7,411,707 | B2 | 8/2008 | Ikeda |
| 7,420,705 | B2 | 9/2008 | Yamada et al. |
| 7,450,281 | B2 | 11/2008 | Torigoe et al. |
| 7,591,521 | B2 * | 9/2009 | Aruga ............................. 347/13 |
| 7,636,178 | B2 | 12/2009 | Nakatani et al. |
| 7,639,399 | B2 | 12/2009 | Ikeda |
| 7,643,178 | B2 | 1/2010 | Yamada et al. |
| 7,688,489 | B2 | 3/2010 | Nagoshi et al. |
| 7,750,921 | B2 | 7/2010 | Akiyama et al. |
| 7,869,092 | B2 | 1/2011 | Nakatani et al. |
| 7,912,280 | B2 | 3/2011 | Miyagi et al. |
| 2002/0063746 | A1 | 5/2002 | Suzuki et al. .................. 347/19 |
| 2003/0086100 | A1* | 5/2003 | Yashima ................ B41J 2/0451 358/1.8 |
| 2006/0232799 | A1 | 10/2006 | Nakatani et al. |
| 2007/0139676 | A1 | 6/2007 | Shimada |
| 2008/0144060 | A1 | 6/2008 | Ishikawa |
| 2008/0239353 | A1 | 10/2008 | Hori et al. |
| 2008/0239355 | A1 | 10/2008 | Goto et al. |
| 2008/0239410 | A1 | 10/2008 | Hashii et al. |
| 2009/0116046 | A1 | 5/2009 | Nakashio |

FOREIGN PATENT DOCUMENTS

| | | |
|---|---|---|
| EP | 0 863 012 | 9/1998 |
| EP | 1 157 840 | 11/2001 |
| EP | 1 308 279 | 5/2003 |
| EP | 1 310 373 | 5/2003 |
| EP | 1308279 A2 | 5/2003 |
| EP | 1310373 A2 | 5/2003 |
| EP | 1 332 882 | 8/2003 |
| EP | 1332882 A1 | 8/2003 |
| EP | 1798952 A1 | 6/2007 |
| JP | 4-28556 | 1/1992 |
| JP | 10-13674 | 1/1998 |
| JP | 2000-106627 A | 4/2000 |
| JP | 2000-345463 A | 12/2000 |
| JP | 2003-341065 A | 12/2003 |
| JP | 2004-42369 A | 2/2004 |
| JP | 2006-346997 A | 12/2006 |
| JP | 2007-320240 A | 12/2007 |
| JP | 2008-227559 A | 9/2008 |

OTHER PUBLICATIONS

U.S. Appl. No. 12/966,781, filed Dec. 13, 2010. Applicants: Fumitaka Goto, et al.
U.S. Appl. No. 12/966,799, filed Dec. 13, 2010. Applicants: Tomokazu Ishikawa, et al.
U.S. Appl. No. 12/966,757, filed Dec. 13, 2010. Applicants: Makoto Torigoe, et al.
U.S. Appl. No. 12/966,265, filed Dec. 13, 2010. Applicants: Nobutaka Miyake, et al.
U.S. Appl. No. 12/966,769, filed Dec. 13, 2010. Applicants: Tohru Ikeda, et al.
U.S. Appl. No. 12/966,743, filed Dec. 13, 2010. Applicants: Ryosuke Iguchi, et al.
U.S. Appl. No. 12/966,848, filed Dec. 13, 2010. Applicants: Senichi Saito, et al.
U.S. Appl. No. 12/966,837, filed Dec. 13, 2010. Applicants: Mitsuhiro Ono, et al.
Chinese Office Action dated Jun. 4, 2013 in counterpart CN Appl. No. 201110134967.5.
Japanese Office Action issued on Jul. 30, 2013 in Japanese Application No. 2011-115992, which claims priority to JP 2010-118669 (the corresponding JP priority application for the present application).

* cited by examiner

IMAGE PROCESSOR, PRINTING APPARATUS, AND IMAGE PROCESSING METHOD

BACKGROUND OF THE INVENTION

Field of the Invention

The present invention relates Loan image processor, an inkjet printing apparatus, a data generating apparatus, and an image processing method. In particular, the present invention relates to an image processing for reducing the color unevenness caused by the variation in the ejecting characteristic among a pluralitie of nozzles for ejecting ink.

Description of the Related Art

Printing heads used in ink jet-type printing apparatuses may vary, due to errors during the manufacture thereof for example, among a plurality of nozzles with regard to the ejecting characteristic (e.g., an ejection volume or an ejecting direction). Such variation tends to cause the resultant printed image to have a density unevenness.

Conventionally, as a processing for reducing such a density unevenness, the use of a head shading technique as disclosed in Japanese patent Laid-Open No. H10-013674 (1998) has been known. The head shading corrects image data depending on the information regarding the ejecting characteristics of the individual nozzles. By this correction, the number of ink dots that are finally printed can be increased or reduced depending on each nozzle to thereby provide, in the resultant printed image, a substantially-even density among the nozzles.

However, even when the head shading technique as described above is used to reproduce a multi dimensional color by overlapping two or more types of inks, a so-called color deviation may be caused where a region printed by a nozzle having an ejection volume different from a standard volume has a different color from an originally-intended color to be printed.

For example, in order to print a blue image by using cyan ink of a standard ejection volume and magenta ink of an ejection volume higher than a standard volume, magenta ink having a higher ejection volume than a standard ejection volume is printed on a printing medium in the form of dots larger than those of cyan. When the printing head as described above is subjected to the correction by the head shading (HS processing), magenta is printed in the form of dots of a smaller number than a standard number (i.e., dots of a smaller number than the number of cyan dots). As a result, the resultant blue image region is formed to include both of not-overlapped cyan dots having a standard size and overlapped dots in which magenta dots larger than cyan dots includes therein cyan dots. Thus, the region as described above has a color different from that of a blue image formed by cyan dots and magenta dots of a standard size and a standard number. The reason is that the former image and the latter image are different in the ratio of self-colored cyan to the printing medium, the ratio of self-colored magenta to the printing medium, and the ratio of blue by overlapped cyan and magenta to the printing medium. The fluctuation of the ratio among areas occupied by the respective colors as described above is caused not only by the variation of the ejection volume but also by the variation of the ejecting direction. Specifically, even when the conventional head shading was used and the density unevenness of the cyan image or the magenta image was solved, the resultant blue image represented by overlapping the cyan image and the magenta image could not avoid the color difference due to the variation of the ejecting characteristic. Furthermore, since the degree of a color difference is different among regions printed by nozzles having different ejecting characteristics, the respective regions that should have the same color show different colors to be recognized, thus resulting in the recognition of the color banding.

SUMMARY OF THE INVENTION

The present invention has been made in order to solve the above disadvantages. Thus, it is an objective of the present invention to provide an image processor, an inkjet printing apparatus, a data processing apparatus, and an image processing method that can reduce, when a plurality of types of inks are used to print an image, the color difference in a multi dimensional color image due to the variation of ejecting characteristics among a pluralities of nozzles.

The first aspect of the present invention is an image processor for a printing apparatus which performes printing by using a plurality of nozzle arrays, in each of which a plurality of nozzles are arranged and which correspond to a plurality of ink colors respectively, comprising: a storage unit configured to store a plurality of conversion tables; and a conversion unit configured to convert, based on a plurality of conversion tables, inputted color signals corresponding to a plurality of colors to color signals corresponding to a plurality of ink colors at least including a first color and a second color different from the first color, wherein the plurality of conversion tables are a plurality of conversion tables for reducing a color difference of a multi dimensional color formed by ink of the first color and ink of the second color caused by a variation of ejecting characteristics in a direction along which nozzles are arranged of a first nozzle array corresponding to ink of the first color and a second nozzle array corresponding to ink of the second color, respectively, and the plurality of conversion tables correspond to the respective predetermined areas obtained by dividing the printing medium to a plurality of areas: each of the predetermined areas being printed by at least one nozzle of the first nozzle array and the second nozzle array, respectively.

The second aspect of the present invention is an image processing method for a printing apparatus which performes printing by using a plurality of nozzle arrays, in each of which a plurality of nozzles are arranged and which correspond to a plurality of ink colors, respectively, wherein, inputted color signals corresponding to a plurality of colors are converted to color signals corresponding to a plurality of ink colors at least including a first color and a second color different from the first color in accordance with a plurality of conversion tables, wherein the plurality of conversion tables are conversion tables for reducing a color difference of a multi dimensional color formed by ink of the first color and ink of the second color caused by a variation of ejecting characteristics in a direction along which nozzles are arranged of a first nozzle array corresponding to ink of the first color and a second nozzle array corresponding to ink of the second color, respectively, and the plurality of conversion tables correspond to the respective predetermined areas obtained by dividing the printing medium to a plurality of areas each of which are printed by at least one nozzle of the first nozzle array and the second nozzle array, respectively.

The third aspect of the present invention is an printing apparatus which performes printing by using a plurality of nozzle arrays, in each of which a plurality of nozzles are arranged and which correspond to a plurality of ink colors, respectively, comprising: a storage unit configured to store a plurality of conversion tables; a conversion unit configured to convert, based on the plurality of conversion tables, inputted color signals corresponding to a plurality of colors to color signals corresponding to a plurality of ink colors at least including a first color and a second color different from the first color; and a printing unit configured to perform printing on a printing medium based on the color signals corresponding to the plurality of inks converted by the conversion unit, wherein the plurality of conversion tables are a plurality of conversion tables for reducing a color difference of a multi dimensional color formed by ink of the first color and ink of the second color caused by a variation of ejecting characteristics in a direction along which nozzles are arranged of a first nozzle array corresponding to ink of the first color and a second nozzle array corresponding to ink of the second color, and the plurality of conversion tables correspond to the respective predetermined areas obtained by dividing the printing medium to a plurality of areas: each of the predetermined areas being printed by at least one nozzle of the first nozzle array and the second nozzle array, respectively.

The fourth aspect of the present invention is an image processor for converting a color signal corresponding to image data represented by a plurality of elements to a color signal corresponding to a plurality of inks at least including a first ink and a second ink different from the first ink, wherein the color signal corresponding to the plurality of inks is a color signal for performing printing on a printing medium by ejecting the plurality of inks through a printing head that has a first nozzle array in which a plurality of nozzles for ejecting the first ink are arranged in a predetermined direction and a second nozzle array in which a plurality of nozzles for ejecting the second ink are arranged in a predetermined direction, the image processor comprising: a storage unit configured to store conversion tables for reducing a color difference of a multi dimensional color caused by a variation of ejecting characteristics of a nozzle group of the first nozzle array and a nozzle group of the second nozzle array used to print a predetermined area of the printing medium among a plurality of nozzle groups that is obtained by dividing the first nozzle array and the second nozzle array to a plurality of nozzle groups, respectively, so that the conversion tables correspond to the respective plurality of nozzle groups; a first conversion unit configured to use the conversion tables to convert the color signals corresponding to the image data represented by the plurality of elements; and a second conversion unit configured to converte the color signals converted by the first conversion unit to color signals corresponding to the plurality of inks.

Further features of the present invention will become apparent from the following description of exemplary embodiments with reference to the attached drawings.

DESCRIPTION OF THE EMBODIMENTS

The following section will describe in detail an embodiment of the present invention with reference to the drawings.

Figure 1:
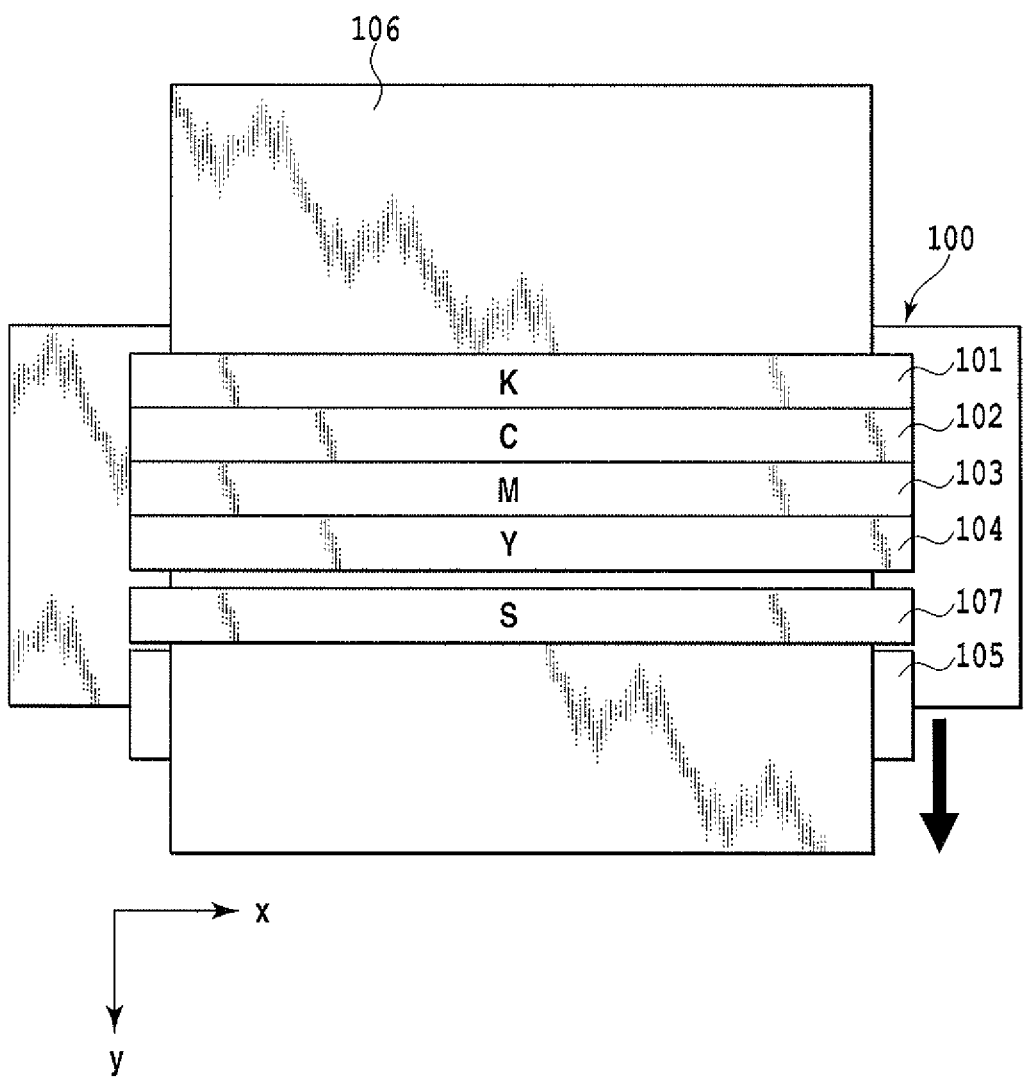
FIG. 1 is a schematic view of an ink jet printer according to one embodiment of the present invention.

FIG. 1 is a schematic view of a printer as an inkjet printing apparatus according to one embodiment of the present invention. The printer of this embodiment is a full line-type printing apparatus that includes, as shown in FIG. 1, four nozzle arrays 101 to 104 that are provided on a frame constituting a printer structure. The respective nozzle arrays 101 to 104 have a pluralities of nozzles for ejecting the same type of ink. The pluralities of nozzles are arranged with a pitch of 1200 dpi in the direction x (predetermined direction) corresponding to the width of a printing paper 106. The respective nozzle arrays 101 to 104 eject inks of black (K), cyan (C), magenta (M), and yellow (Y). The nozzle arrays 101 to 104 for ejecting the plurality of types of inks are arranged as shown in the direction y, thereby defining the printing head of this embodiment.

The printing paper 106 as a printing medium is conveyed in the direction y crossing the direction x in the drawing by the rotation of the conveying roller 105 (and other rollers (not shown)) by the driving force from a motor (not shown). While the printing paper 106 is being conveyed, the respective nozzles of the printing heads 101 to 104 perform ejection operations in accordance with the to-be-printed data at a frequency depending on the conveying speed of the printing paper 106. As a result, dots of the respective colors are printed to correspond to the to-be-printed data with a predetermined resolution, thereby forming an image corresponding to one page of the printing paper 106.

At the downstream of the printing heads 101 to 104 in the direction y, a scanner 107 is provided in which reading elements are arranged at a predetermined pitch so as to be parallel with the printing heads 101 to 104. The scanner 107 can read the image printed by the printing heads 101 to 104 to output the image as RGB multivalued data.

Printing apparatuses to which the present invention can be applied are riot limited to the full line-type apparatus as described above. For example, the present invention also can be applied to a so-called serial type printing apparatus for which a printing operation is performed by scanning a printing head arid a scanner in a direction crossing the conveying direction of a printing paper.

Figure 2:
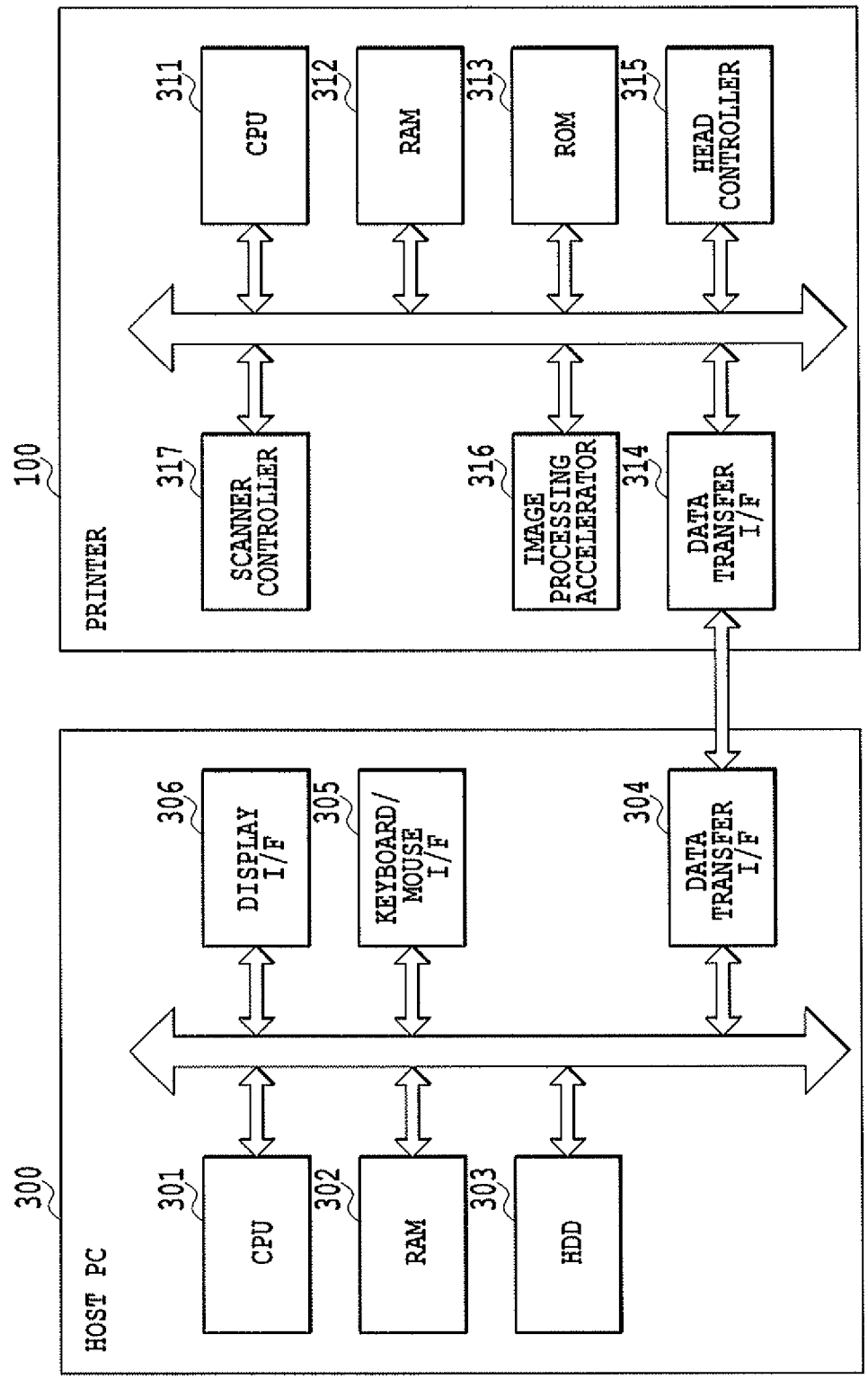
FIG. 2 is a block diagram illustrating a printing system according to one embodiment of the present invention.

FIG. 2 is a block diagram illustrating a printing system according to one embodiment of the present invention. As shown in FIG. 2, this printing system is configured to include: a printer 100 shown in FIG. 1; and a personal computer (PC) 300 as a host computer, to the printer 100.

The host PC 300 is configured to include the following elements. The CPU 301 carries out a processing in accordance with a program stored in an HDD 303 and a RAM 302 functioning as storage means. The RAM 302 is a volatile storage that temporarily retains a program and data. The HDD 303 is a non-volatile storage that similarly retains a program and data. In this embodiment, MCS data that is unique to the present invention is also stored in the HDD 303. A data transfer interface (I/F) 304 controls the transmission and reception of data between the host PC 300 and the printer 100. A connection style for the data transmission/reception may be USB, IEEE1394, or LAN for example. A keyboard/mouse I/F 305 is an I/F that controls a Human Interface Device (HID) such as a keyboard or a mouse. A user can perform an input operation through this I/F. A display I/F 306 controls a display (not shown).

On the other hand, the printer 100 is configured to mainly include the following elements. A CPU 311 performs, in accordance with a program retained in a ROM 313 or a RAM 312, the processings of the respective embodiments (which will be described later). The RAM 312 is a volatile storage that temporarily retains a program and data. The ROM 313 is a nonvolatile storage that can retain table data or a program used in a processing (which will be described later).

A data transfer I/F 314 controls the data transmission/reception between the printer 100 and the PC 300. A head controller 315 supplies to-be-printed data to the respective printing heads 101 to 104 shown in FIG. 1 and controls the ejecting operation of the printing head. Specifically, the head controller 315 can be configured to read a control parameter and to-be-printed data from a predetermined address of the RAM 312. Then, when the CPU 311 writes the control parameter and the to-be-printed data to the predetermined address of the RAM 312, a processing is activated by the head controller 315, thereby providing ink ejection through the printing head. A scanner controller 317 outputs to the CPU 311 RGB data obtained from the individual reading elements of the scanner 107 shown in FIG. 1 while controlling the individual reading elements.

An image processing accelerator 316 is a hardware that can perform an image processing at a higher speed than that of the CPU 311. Specifically, the image processing accelerator 316 is configured to read a parameter and data required for the image processing from a predetermined address of the RAM 312. Then, when the CPU 311 writes the parameter and the data to the predetermined address of the RAM 312, the image processing accelerator 316 is activated, thereby subjecting the data to the predetermined image processing. In this embodiment, a processing for preparing parameters for a table used in an MCS processor (which will be described later) is carried out by software by the CPU 311. On the other hand, the image processing for printing including the processing by the MCS processor is carried out by a hardware processing by the image processing accelerator 316. It is noted that the image processing accelerator 316 is not an essential element and the processing for preparing table parameters and an image processing also may be carried out only by the processing by the CPU 311 depending on the specification of the printer for example.

The following description will describe an embodiment for reducing, in the printing system as described above, the color difference of the multi dimensional color caused by the variation of ejecting characteristics among a pluralities of nozzles when a plurality of types of inks are used for a printing operation.

Figure 3A:
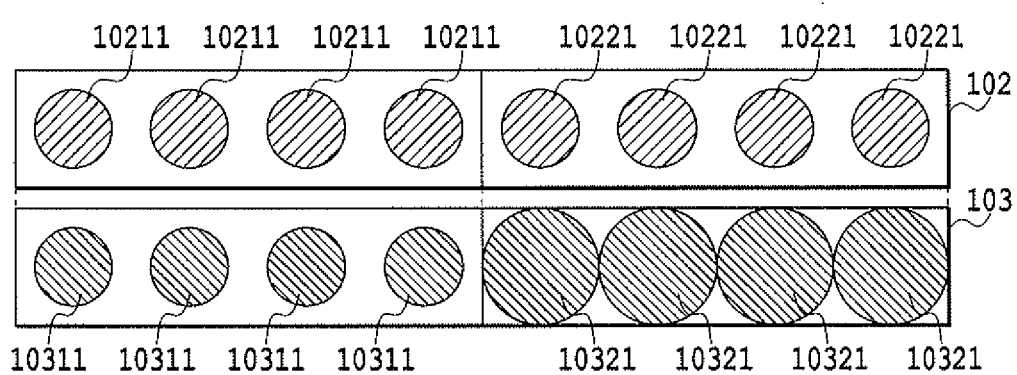
FIGS. 3A to 3C illustrate the difference of color when a blue image is printed by a conventional head shading.
Figure 3B:
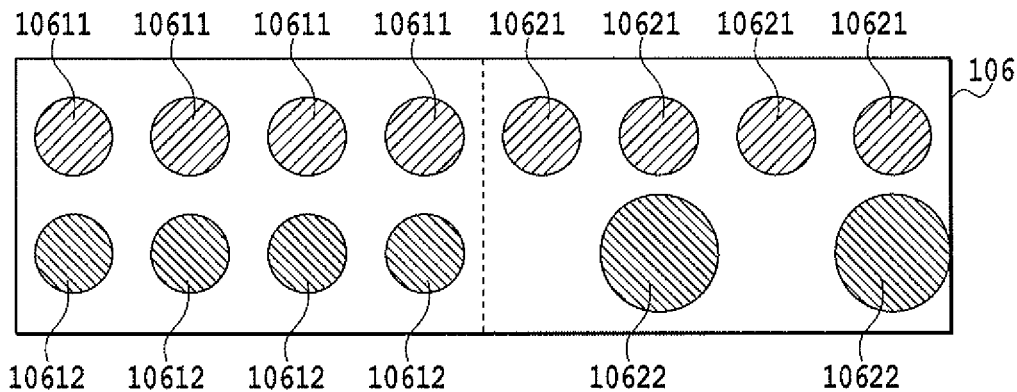
Figure 3C:
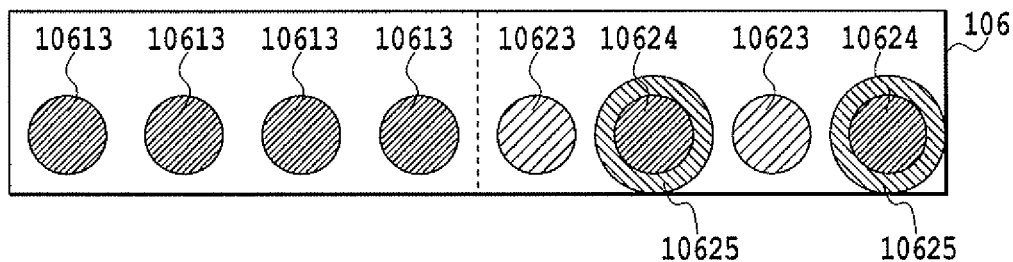

FIGS. 3A to 3C illustrate the color difference when a blue image which is secondary color printed by overlapping two colors of inks after having conducted conventional head shading. In FIG. 3A, the reference numeral 102 denotes a printing head for ejecting the first ink of cyan ink and the reference numeral 103 denotes a printing head for ejecting the second ink of magenta ink, respectively. In FIG. 3A, for the convenience of simple description and illustration, only eight nozzles are shown from among a pluralities of nozzles in the respective printing heads (i.e., in the first nozzle array for ejecting cyan ink and the second nozzle array for ejecting magenta ink). In order to explain the color difference caused when the secondary color of blue is printed by cyan ink and magenta ink, only the two printing heads for cyan and magenta are shown.

All of the eight nozzles 10211 to 10221 for cyan ink of the printing head 102 can eject a standard volume of ink in a standard direction to print dots of the same size on a printing medium with a fixed interval. All of the eight nozzles for magenta of the printing head 103 on the other hand can eject ink in a standard ejecting direction but the four nozzles 10311 at the left side in the drawing eject a standard ejection volume and the four nozzles 10321 at the right side eject an ejection volume higher than the standard volume. Thus, the left-shown region (the first area) includes therein magenta dots printed to have the same size as that of cyan dots while the right-shown region (the second area) includes therein magenta dots printed to have a larger size than that of the cyan dots with the same fixed interval as that of the cyan dots.

When the use of the printing head having the ejection volume characteristic as described above is combined with the correction of image data by the conventional head shading, image data corresponding to the magenta nozzles 10321 is corrected in a further-reduced direction. As a result, dots data (binary data) for determining to print (1) dots or not to print (0) dots is generated so that the number of dots finally printed through the magenta nozzles 10321 is lower than the number of dots printed by the magenta nozzles 10311.

FIG. 3B illustrates the dot printing status of dot data when the head shading correction is provided on a solid image (i.e., image data in which both of cyan and magenta are 100%-duty). For description, cyan dots and magenta dots are not overlapped in FIG. 3B. In FIG. 3B, the reference numerals 10611 denote dots printed by the cyan nozzles 10211 on a printing paper and the reference numerals 10621 denote dots printed by the cyan nozzles 10221 on the printing paper. The reference numerals 10612 denote dots printed by the magenta nozzles 10311 on the printing paper. The reference numerals 10622 denote dots printed by the magenta nozzles 10321 on the printing paper. Although FIGS. 3A to 3C show the sizes of the individual nozzles and the sizes of dots printed by the respective nozzles to be equal, this is for describing the correspondence therebetween and the former is not equal in an actual case.

FIG. 3B shows a case where dots formed by the magenta nozzles 10321 on the printing paper have a twice area than the area of dots formed by the magenta nozzles 10221. In this case, if the head shading is used to suppress the number of ejections of the magenta nozzles 10321 to about ½ of the number of ejections of the magenta nozzles 10221 (4 dots→2 dots), the former and the latter can have, to the printing paper, substantially the same area covered by magenta. However, the halving of the number of dots as described above is for the simple description in this example. In an actual case, the covered area is not always proportional to a detected density. Thus, in the general head shading, the numbers of dots printed in the respective regions are adjusted so that substantially equal density can be detected in each nozzle region.

FIG. 3C shows the printing status where cyan dots and magenta dots are overlapped based on the dot data obtained through the head shading. In FIG. 3C, the first area of the printing paper 106 includes standard-size blue dots 10613 that are formed by overlapping of standard-sized cyan dots and magenta dots and the second area includes both of standard-size cyan dots 10623 and blue dots that are formed by overlapping standard-size cyan dots 10623 and magenta dots having a size two times larger than the standard-size cyan dots. The blue dots obtained by overlapping standard-size cyan dots and magenta dots having a size two times larger than the standard-size cyan dots can be further classified to a blue area 10624 where cyan and magenta are completely overlapped and a magenta area 10625 surrounding the blue area 10624.

In the HS processing, the number of to-be-printed dots is adjusted so that the total of the cyan area (dots) 10623 =the total of the blue areas 10624=the total of the magenta areas 10625. Thus, if the color observed by the combination of the light absorption characteristic of the cyan areas 10623 and the light absorption characteristic of the magenta areas 10625 is equal to the color observed by the light absorption characteristic of the blue areas 10624, the region can be recognized to have substantially the same color as that of the blue area 10624. As a result, the blue image of the first area can be recognized to have the same color as the blue image of the second area on the printing paper 106.

However, when the multi dimensional color is formed by overlapping a pluralities of different types of inks as in the blue area 10624, the color observed by the light absorption characteristic of the resultant area does not always equal to the color observed by the combination of the light absorption characteristics of the areas of the respective pluralities of inks. As a result, the entirety of the resultant region has a different color from the target standard color. Specifically, due to the variation of the ejecting characteristic of nozzles used for the printing of the same region in the printing paper 106, the blue image of the first area is undesirably sensed to have a different color from that of the blue image of the second area.

The variation of the ejection volume among nozzles also causes the variation of the dot size in the case of a multi-valued printing apparatus such as a four valued printing apparatus in which printing is performed using three sizes of large, medium, and small dots. Even when the correction by the conventional head shading is provided, the color difference also may be caused in this case due to the same reason as the above-described one. Thus, the present invention is not limited to a binary printing apparatus and also can be applied to a three valued or more multivalued printing apparatus.

An embodiment of the present invention described below is to reduce the color difference as described above by performing a correction processing to the image data before quantization that consists of a pluralities of combinations of color signals.

(First Embodiment)

Figure 4A:
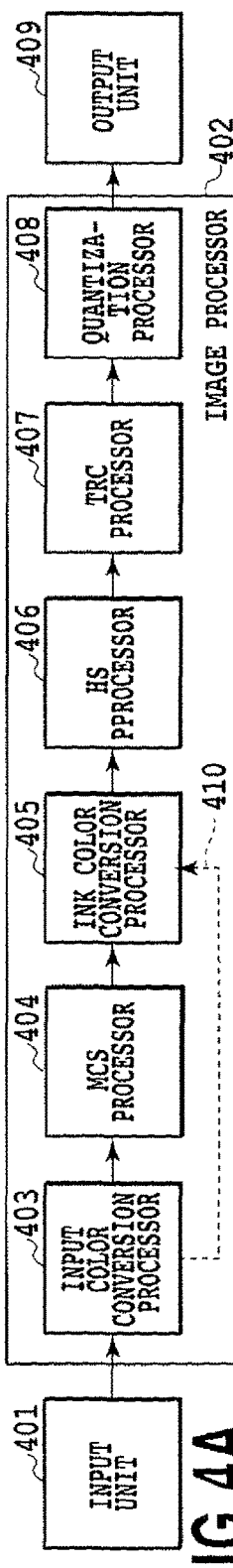
FIGS. 4A to 4D are block diagrams illustrating the configuration of an image processing carried out by an ink jet printer according to an embodiment of the present invention.

FIG. 4A is a block diagram illustrating the configuration of the image processing carried out by an ink jet printer according to the first embodiment of the present invention. Specifically, this embodiment provides an image processor by the respective control and processing elements of the printer 100 shown in FIG. 2. The present invention is not limited to this embodiment. For example, the PC 300 shown in FIG. 2 also may constitute the image processor. Alternatively, a part of the image processor may be configured by the PC 300 and the other parts may be configured by the printer 100.

As shown in FIG. 4A, an input unit 401 outputs image data received from the host PC 300 to an image processor 402. The image processor 402 is configured to include: an input color conversion processor 403; an MCS processor 404; an ink color conversion processor 405; an HS processor 406, a TRC processor 407, and a quantization processor 408.

In the image processor 402, the input color conversion processor 403 firstly converts the input image data received from the input unit 401 to image data corresponding to the color reproduction range of the printer. In this embodiment, the image data to be inputted is data showing the color coordinates (R, G, B) in color space coordinates such as sRGB as colors represented by the monitor. The input color conversion processor 403 subjects the respective 8 bit input image data R, G, and B to a known method such as a matrix computation processing or a processing using a three dimensional LUT to convert the data to the image data (R', G', B'), that is a color signal composed of three elements, within the color reproduction range of the printer. In this embodiment, a three dimensional lookup table (LUT) is combined with an interpolation computation to perform the conversion processing. In this embodiment, the 8 bit image data handled in the image processor 402 has a resolution of 600 dpi. The binary data obtained by the quantization by the quantization processor 408 has a resolution 1200 dpi as described later.

The MCS (Multi Color Shading) processor 404 functions as the first conversion means of this embodiment to subject the image data converted by the input color conversion processor 403 to a conversion processing for correcting the color difference. This processing is also carried out by a conversion table consisting of a three dimensional lookup table as described later. By this conversion processing, even when there is the variation of the ejecting characteristic among the nozzles of the printing head in an output unit 409, the above-described color difference due to the variation can be reduced. The specific contents of the table of the MCS processor 404 and the conversion processing using the table will be described later.

The ink color conversion processor 405 functions as the second conversion means of this embodiment to convert the respective pieces of 8 bit image data of R, G, B processed by the MCS processor 404 to image data of the color signal data corresponding to inks used in the printer. The printer 100 in this embodiment uses black (K) ink, cyan (C) ink, magenta (M) ink, and yellow (Y) ink. Thus, the image data of the RGB signal is converted to image data consisting of the respective 8 bit K, C, M, and Y color signals. This color conversion is also carried out by the combination of the three dimensional lookup table and the interpolation computation as in the above-described input color conversion processor. As described above, other conversion methods such as a matrix computation processing also may be used.

The head shading (HS) processor 406 accepts the ink color signal image data, and converts the respective 8-bit data for each ink color into ink color signal image data according to the individual ejection volumes of the nozzles that constitute the print heads. Specifically, the HS processor 406 performs the same processing as the conventional head shading processing. In this embodiment, this HS processing is performed by using one dimensional lookup table.

A Tone Reproduction Curve (TRC) processor 407 corrects the image data consisting of the respective 8 bit ink color signals subjected to the HS processing in order to adjust the number of dots printed by the output unit 409 with regards to the respective ink colors. Generally, there is no linear relation between the number of dots printed on the printing medium and the optical density realized by the number of dots on the printing medium. Thus, in order to make this relation linear, the TRC processor 407 corrects the respective 8 bit image data to adjust the number of dots to be printed on the printing medium.

The quantization processor 408 performs a quantization processing on the respective 8 bit 256 valued ink image data processed by the TRC processor 407 to generate one bit binary data representing printing of "1" or no printing of "0". The present invention is not particularly limited to the form of the quantization 408. For example, 8 bit image data maybe directly converted to binary data (dots data) or the data also may be once converted to a few bit multivalued data to subsequently convert the resultant data to binary data. The quantization processing method also may be an error diffusion method or other pseudo continuous tone processings such as the dither method.

The output unit 409 drives the printing head based on the binary data (dots data) obtained by the quantization and ejects the respective colors of inks to the printing medium to thereby perform printing. In this embodiment, the output unit 409 is configured by a printing mechanism including the printing heads 101 to 104 shown in FIG. 1.

Figure 5A:
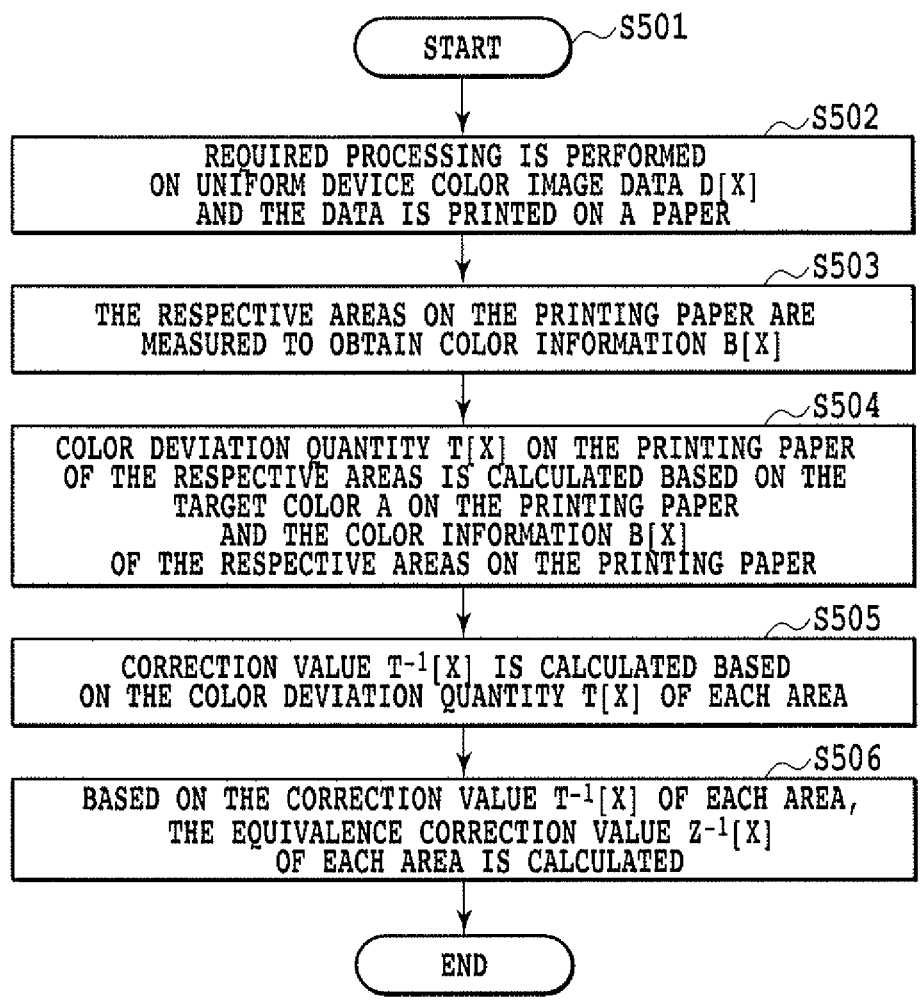
FIGS. 5A and 5B are flowcharts illustrating a step of generating parameters for a conversion table used in an MCS processor and a step of using the generated parameters to perform an image processing during an actual printing, respectively.
Figure 5B:
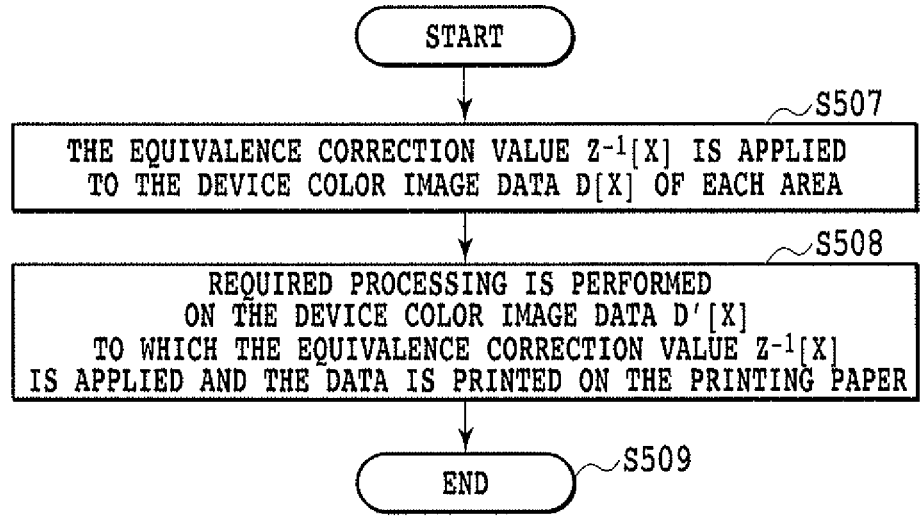

FIGS. 5A and 5B are a flowchart for describing a step of generating parameters of the table used in the MCS processor 404 shown in FIG. 411 and a step of using the parameters generated in the actual printing to perform an image processing, respectively.

FIG. 5A is a flowchart for describing the respective steps performed by the CPU 311 in order to generate the parameters for a conversion table as a three dimensional look up table used by the MCS processor 404 functioning as the first conversion means of this embodiment. In this embodiment, such parameter generation processing is forcedly or selectively performed at the manufacture of the printer, after the use of the printer for a predetermined period, or after the printing in a predetermined amount. The parameter generation processing also may be performed prior to every printing for example. Specifically, this processing can be performed as a so-called calibration to update the table parameters constituting the contents of the conversion table.

FIG. 5B is a flowchart illustrating the steps of the MCS processor 404 that are performed, in order to generate data to be printed by the printer, as a part of the image processing of the image processor 402 shown in FIG. 4A performed by the accelerator 316.

First, the processing to generate the table parameters shown in FIG. 5A will be described. In this embodiment, the table parameters of the MCS processor are generated based on the assumption that the table parameters of the HS processor 406 are prepared. Thus, at Step S501 at which this processing is activated, the table parameters of the HS processor are already generated (updated) by a known method. In the generation of the table parameter of the HS processor, in order to suppress the variation of the density represented on the printing medium, parameters are prepared so that a nozzle having a high ejection volume corresponds to a smaller number of ejections while a nozzle having a low ejection volume corresponds to higher number of ejections for example for the respective ink colors. Thus, with regard to the nozzle 10321 of the magenta head 103 shown in FIG. 3A for example, parameters are prepared such that the number of dots is reduced to approximately half as shown in FIG. 3B. With regard to the cyan head 102, parameters are prepared such that the number of dots is not change as shown in FIG. 3B. As described above, in this embodiment, the table parameters of the MCS processor are generated or updated after completing the table parameters of the HS processor. As a result, the parameters of the MCS processor can be generated so that the color difference due to the variation of the ejecting characteristic among nozzles can be appropriately reduced by the total processing by the MCS processor and the HS processor.

When the processing for generating the table parameters of the MSC processor is started, Step S502 is firstly performed to eject ink through all nozzles of the respective printing heads shown in FIG. 1 to print the measurement image (patch) on the printing medium. In this case, with regard to the respective R, G, and B, signal values 0 to 255 may be equally divided by 17 for example so that patches can be printed for all of 17×17×17 combinations (lattice points). Alternatively, in order to reduce the memory and the working time, such lattice points for which the color deviation tends to significantly change due to the ejecting characteristic may be selected from among the lattice points so that patches can be printed only with regards to the combinations of R, G, and B corresponding to these lattice points. One of the lattice points may be, for example, R=0, G=0, and B=255 corresponding to the blue image described in FIG. 3. The colors (lattice points) for printing the measurement image may be selected, for example, by determining the combinations of R, G, and B for which the color deviation tend to increase depending on the ejection volume by a predetermined amount, then the types of patches (combinations of color signal) or the number thereof can be determined considering the computation load or the memory capacity.

The following section will describe a method of printing a measurement image in accordance with FIG. 4A. When patches are printed, the selected few combinations of image data (R, G, B) is inputted as the image data subjected to the processing by the input color conversion processor 403 (hereinafter referred to as device color image data D[X]) to the ink color conversion processor 405 without experiencing the processing by the MCS processor 404. The route as described above is shown in FIG. 4A as a bypass route shown by the broken line 410. This process involving a bypass route may also be conducted by preparing a table wherein input values equal output values, such that the device color image data D[X] is input into the MCS processor 404, output values are equal to the input values regardless of X, for example.

Thereafter, the data is subjected to the same processing as that for normal data by the HS processor 406, the TRC processor 407, and the quantization processor 408. Then, the output unit 409 prints the measurement image on the printing paper 106. In this process, the image data of the measurement image represented by (R, G, B) is converted by the ink color conversion processor 405 to the image data (C, M, Y, K) based on the ink color signal. In this conversion, if one of the image data of the measurement image for example is R=0, G=0, and B=255, the signal value thereof is converted to the image data of (K, C, M, Y)=(0, 255, 255, 0) (i.e., data for which cyan and magenta are 100%—printed, respectively). Thereafter, the HS processor 406 and the subsequent processing turn the image data of (K, C, M, Y)=(0, 255, 255, 0) into the dot data shown in FIG. 3B and the resultant data is printed. For the sake of simplicity in the following description, table parameters and their generation process will be described only for the parameters corresponding to the lattice point indicated by the image data for such a blue measurement image.

Here, X represents the information showing, by a unit of four nozzles, the positions of the nozzles in the direction x in the printing heads 101 to 109 of the respective colors shown in FIG. 1. In the MCS processing of this embodiment, among a pluralities of nozzles, one nozzle group of four nozzles is assumed as a unit subjected to the processing. Thus, the image data is corrected based on a unit of one nozzle group. The device color image data D[X] shows image data to be printed by four nozzles corresponding to X of the respective ink colors.

Figure 6A:
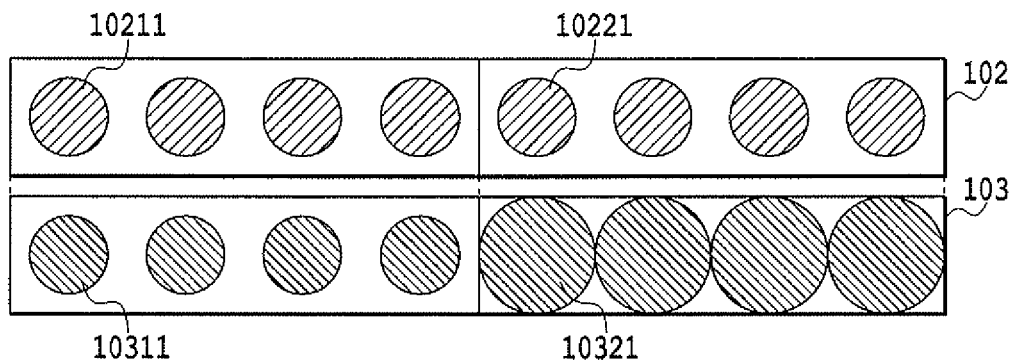
FIGS. 6A and 6B illustrate the printing status of a measurement image.
Figure 6B:
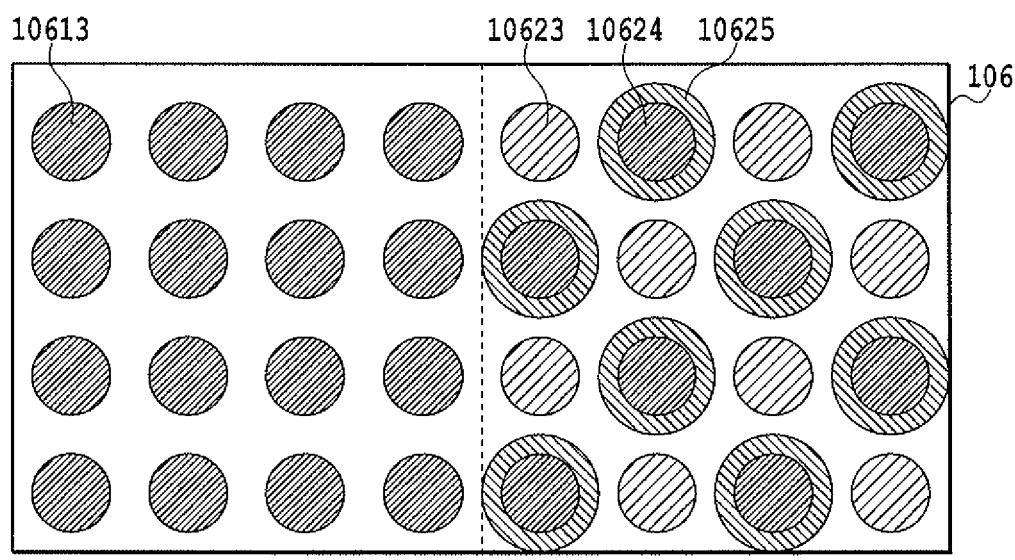

FIGS. 6A and 6B illustrate the printing status of the measurement image in the above Step S502. In FIGS. 6A and 6B, the same elements as those shown in FIGS. 3A to 3C will be denoted with the same reference numerals and will not be described further.

FIG. 6A illustrates, as in FIG. 3A, a case where the four nozzles corresponding to the second area among the nozzles of the magenta printing head 103 have a greater-than-standard ejection volume. Thus, by subjecting the image data (K, C, M, Y)=(0, 255, 255, 0) showing blue to the HS processing, the measurement image of the secondary color of blue as shown in FIG. 6B is printed. Specifically, the second area including nozzles having a greater-than-standard ejection volume includes therein a color difference. Thus, patches of colors different from the standard blue of the first area are printed.

With reference to FIG. 5A again, in Step S503, the measurement image printed on the printing paper 106 in Step S502 is measured by the scanner 107 to thereby obtain the color information B[X] (RGB data) corresponding to the respective areas X. In this embodiment, the scanner resolution (i.e., the pitch at which the reading elements are arranged) is not particularly limited. The scanner resolution may be higher or lower than the printing resolution of 1200 dpi of the printing head. As shown in FIG. 1, the scanner 107 does not always have to be the full line-type one as the printing head and also may be the serial-type one that performs color measuring at a predetermined period while moving in the direction x of FIG. 1. Alternatively, the scanner 107 also may be a scanner separate from the printer. In this case, the scanner is connected to the printer by signals for example so that the measurement result may be automatically inputted from the scanner. The color information B[X] does not always have to be ROB information and also may be in any form such as L*a*b* measured by a color measurement unit for example. Color measurement may be performed in any form and with any resolution in this embodiment so long as various processing such as averaging can be used to appropriately obtain the color measurement result B[X] for the area corresponding to four nozzles.

As described above, the blue measurement image of the lattice points for the device color image data D[X] of (R, G, B)=(0, 0, 255) is printed by the cyan and magenta printing heads 102 and 103 shown in FIG. 1. Then, based on units of the areas corresponding to the respective nozzle groups (four nozzles in this embodiment), the color information B[X] is acquired by the scanner 107.

The following description will be described based on the assumption that the first area corresponds to X=1, the second area corresponds to X=2, and the color information of the first area corresponds to B[19 =(R1, G1, B1), and the color information of the second area corresponds to B[2]=(R2, G2, B2).

In Step S504, based on the target color A=(Rt, Gt, Bt) and the color information B[X] acquired in Step S503, the color deviation quantity T[X] of each area [X] is calculated. The target color A is a color measurement value used as a target when the signal of (R, G, B)=(0, 0, 255) is subjected to the printing and measured by the printer of this embodiment. The target color A can be actually obtained by subjecting the image printed by nozzles having a standard ejection volume to the color measurement by the scanner 107.

Specifically, the color deviation quantity T showing a color difference can be represented as shown below.

color deviation quantity $T[1]=B[1]-A=(R1-Rt, G1-Gt, B1-Bt)$ color deviation quantity $T[2]=B[2]-A=(R2-Rt, G2-Gt, B2-Bt)$ In this example, the first area corresponds to cyan and magenta both in a standard ejection volume. Thus, the result is basically R1=Rt, G1=Gt, and B1=Bt and the color deviation quantity is T[1]=0. The second area on the other hand corresponds to cyan of a standard ejection volume and magenta of a greater-than-standard ejection volume. Thus, values different from the target color (Rt, Gt, Bt) are inevitably detected. For example, when cyan is strongly represented compared to the target blue as in the case of R2<Rt, G2=Gt, and B2=Bt, the result is T[2]=((R2−Rt≠0), 0, 0).

Next, in Step S505, based on the color diviation quantity T[X] of each area [X], the correction value $T^{-1}[X]$ is calculated. In this embodiment, a reverse conversion formula is simply used to obtain a correction value used for conversion as shown, in the following formula.

$T^{-1}[X]=-T[X]$

Thus, the first area and the second area can have correction values represented by the following formulae, respectively.

$T^{-1}[1]=-T[1]=A-B[1]=(Rt-R1, Gt-G1, Bt-B1)$ $T^{-1}[2]=T[2]=A-B[2]=(Rt-R2, Gt-G2, Bt-B2)$

Since T[1]=0 is established, the correction value $T^{-1}[1]$ to the first area is zero. On the other hand, T[2]=((R2−Rt≠0), 0, 0) is also established. Thus, the correction value to the second area can be calculated by $T^{-1}[2]=((Rt-R2≠0), 0, 0)$. In the case of R2<Rt, Rt−R2 results in a positive value and thus is subjected to such a correction that increases red and reduces cyan. In the case of R2>Rt on the contrary, Rt−R2 results in a negative value and thus is subjected to such a correction that reduces red and increases cyan.

In Step S506, based on the correction value $T^{-1}[X]$ of the respective areas, the equivalence correction value $Z^{-1}[X]$ is calculated. The equivalence correction value is a correction value for realizing the correction value $T^{-1}[X]$ obtained in the measured color space in the device color space used in this embodiment and is used as a table parameter of the MCS processor. With regard to the first area, since the correction value $T^{-1}[1]$ in the measured color space is zero, the equivalence correction value $Z^{-1}[1]$ in the device color space is also zero. With regard to the second area on the other hand, a value other than zero is obtained and is used as a correction value for reducing cyan in the device color space in this example.

In the case where the measured color space completely matches the device color space, the following formulae are established.

$$Z^{-1}[1]=T^{-1}[1]=-T[1]=A-B[1]=(Rt-R1, Gt-G1, Bt-B1)$$

$$Z^{-1}[2]=T^{-1}[2]=-T[2]=A-B[2]=(Rt-R2, Gt-G2, Bt-B2)$$

However, those generally do not match each other, thus requiring the color space conversion. When both of the color spaces can be subjected to a linear conversion, a known method such as matrix conversion as described below can be used to calculate an equivalence correction value.

$$Z^{-1}[1] = \begin{bmatrix} a1 & a2 & a3 \\ a4 & a5 & a6 \\ a7 & a8 & a9 \end{bmatrix} \times \begin{bmatrix} Rt-R1 \\ Gt-G1 \\ Bt-B1 \end{bmatrix} \quad [\text{Eq. 1}]$$

$$Z^{-1}[2] = \begin{bmatrix} a1 & a2 & a3 \\ a4 & a5 & a6 \\ a7 & a8 & a9 \end{bmatrix} \times \begin{bmatrix} Rt-R2 \\ Gt-G2 \\ Bt-B2 \end{bmatrix} \quad [\text{Eq. 2}]$$

Herein, a1 to a9 denote a conversion coefficient for converting a measured color space to a device color space.

When both of the color spaces cannot be subjected to a linear conversion on the other hand, a known method such as a three dimensional lookup table also can be used to calculate the following formulae.

$$Z^{-1}[1]=F(Rt-R1, Gt-G1, Bt-B1)$$

$$Z^{-1}[2]=F(Rt-R2, Gt-G2, Bt-B2)$$

In the formulae, F denotes a function to convert a measured color space to a device color space. The conversion relation of the lookup table is in accordance with this function F.

When the relation between the correction value $T^{-1}[X]$ and the equivalence correction value $Z^{-1}[X]$ is different depending on the color, a known method such as a three dimensional lookup table also can be similarly used to calculate the following formulae.

$$Z^{-1}[1]=F(Rt, Gt, Bt)-F(R1, G1, B1)$$

$$Z^{-1}[2]=F(Rt, Gt, Bt)-F(R2, G2, B2)$$

In the formulae, F also denotes a function to convert a measured color space to a device color space.

In the manner as described above, with regard to lattice points selected as a significantly-changing color, table parameters can be calculated for each area [X] corresponding to a nozzle group. Then, table parameters of lattice points other than the above-selected lattice points can be calculated by interpolating the above-selected lattice points. This interpolation method may be a known method and will not be described further.

The equivalence correction value $Z^{-1}[X]$ functioning as table parameters of the respective lattice points calculated in the manner as described above, is stored in a memory as a storage means, for each area [X] in association with the lattice point. The memory used for storage in this embodiment is the HDD 303 of a host PC. However, the memory also may be a nonvolatile memory prepared in the printer body. The memory is preferably handled so that prepared table parameters are prevented from being lost when the power source is turned OFF.

Next, the following section will describe the step of the processing performed by the MOS processor 404 shown in FIG. 5B. This step is a part of a step performed by the image processing accelerator 316 during the general printing operation in accordance with a series of image processings shown in FIG. 4A. In FIG. 4A, this step corresponds to the step performed by the MCS processor 403.

First, an image processing accelerator 316 in Step S507 converts the device color image data D[X] (the first color signal) using table parameters prepared in the manner as shown in FIG. 5A (i.e., equivalence correction value $Z^{-1}[X]$).

Here, in which area of the above-described area [X] the target pixel to be subjected to the image processing is included (the value of X) is determined. In other words, the value of X is determined. Each area [X] corresponds to a region of four nozzles of 1200 dpi. In other hand, since the pixel resolution in the image processing is 600 dpi, each area [X] corresponds to two pixels in the direction x.

When the value X=n of area [X] including the target pixel is obtained, the conversion table prepared to correspond to this area [n] can be referred to thereby acquire the equivalence correction value $Z^{-1}[n]$ based on (R, G, B) indicated by the image data of the target pixel. For example, when the image data of the target pixel indicates blue (R, G, B)=(0, 0, 255), the equivalence correction value $Z^{-1}[n]$ of blue (0, 0, 255) corresponding to the area [n] can be obtained in the manner as described above. Then, the equivalence correction value $Z^{-1}[n]$ is added to the image data of the target pixel based on the following formula to thereby obtain the converted device color image data D'[X] (the second color signal). Specifically, the first color signal D[X] and the second color signal D'[X] have therebetween the relation as shown below.

Device color image data $D'[1]=D[1]+Z^{-1}[1]$ Device color image data $D'[2]=D[2]+Z^{-1}[2]$ In the case of this example, $Z^{-1}[1]=0$ is established for the first area. Thus, D'[1]=D[1] is established. Thus, the image data for the first area is substantially not subjected to the correction in the MCS processing. On the other hand, $Z^{-1}[2]\neq 0$ is established for the second area. Thus, the image data for the second area is corrected by the MCS processing so that D'[2] has reduced cyan than D[2].

Next, in Step S508, the image processing accelerator 316 subjects the device color image data D'[X] obtained in Step S507 to the processings by the ink color conversion processor 905, the HS processor 406, the TRC processor 407, and the quantization processor 408. Then, based on the resultant binary data, the output unit 409 is used to print dots on the printing paper 106.

Figure 7A:
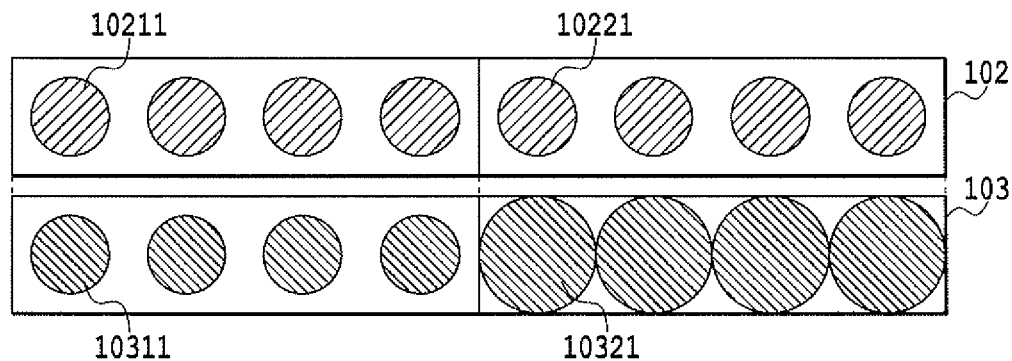
FIGS. 7A and 7B illustrate an example of an image after the MCS processing.
Figure 7B:
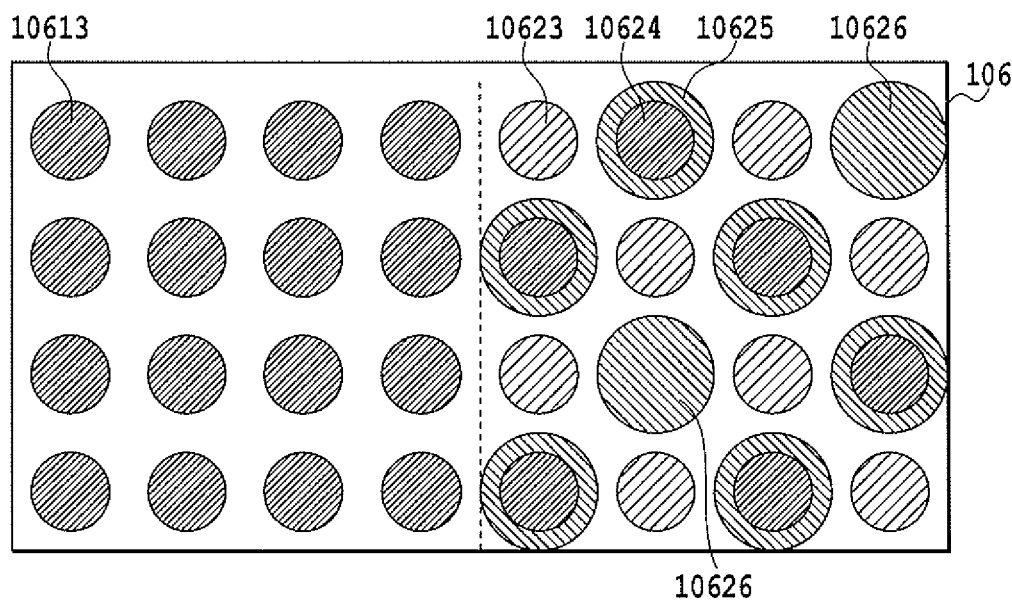

FIGS. 7A and 7B illustrate an example of the image printed by Step S508 of FIG. 5B. As in FIG. 6A, FIG. 7A shows the ejection volume characteristics of nozzles in the cyan and magenta printing heads 102 and 103. FIG. 7B on the other hand shows the printing status of dots obtained through the MCS processing of this embodiment in comparison with the printing status obtained through only the MS processing shown in FIG. 6B. In the status of FIG. 6B, the second area is subjected to the HS processing only and the area determined as having strong cyan. In the status of FIG. 7, the second area is subjected to the MCS processing to generate D'[2] having less cyan than D[2]. As a result, the number of cyan dots 10624 is reduced when compared with the printing status shown in FIG. 6B obtained through the HS processing only.

In the first area and the second area on the printing paper actually printed based on D'[1] and D'[2], a certain level of color difference T[X] occurs due to the variation of the ejection volume inevitably but the color sufficiently close to the target color A is obtained.

Actual color of the first area=color on paper corresponding to D'[1]+T[1]≈A

Actual color of the second area=color on paper corresponding to D'[2]+T[2]≈A

In the formulae, D'[1] ideally equals to the target color A and T[1] ideally equals to zero. D'[2] shows blue for which cyan corresponding to T[2] is reduced with regard to the target color A. T[2] indicates the color difference quantity that increases cyan. In the manner as described above, the first area and the second area can have substantially equal blue, thus reducing the color unevenness due to the color difference therebetween.

As described above, in this embodiment, with regard to a multi dimensional color (a combination of R, G, and B) which tends to significantly changes, a measurement image (patch) is printed on the printing medium and table parameters are calculated based on the measurement result. The change of color depends both of (1) the to-be-printed color itself and (2) the printing characteristics of the respective color inks to the printing medium. For example, with regard to (1), color difference in blue is conspicuous than in the case of red even when the former and the latter have the same variation of the ejection volume. With regard to (2), not only the ejection volume is included but also such factors are included that have an influence on the size or density of dots or the colors of the respective inks in overlapped dots such as the ejecting direction, the dot shape, the permeating rate, and the type of the printing medium.

It is clear that the color difference quantity depends on the combination of the printing characteristics of ink colors used to print the intended color and does not depend on the printing characteristic of ink colors not used for the intended color. Specifically, the type and number of related ink colors are different depending on a pixel. Thus, some pixel may be related to one ink color only and may not cause a color difference quantity.

Although the above description has described a case where all of the magenta nozzles in one group (including four nozzles) for printing the same area have a greater-than-standard ejection volume, there may be a case where the respective nozzles in one area have different ejecting characteristics. Even in such a case, by acquireing an average color difference quantity in the one area and performing a conversion processing which corrects this color difference by using all four nozzles, the above-described effect can be obtained.

By the way, with regard to data that can be represented by a single ink color used in the printing apparatus, a density has already adjusted by the HS processing. Thus, no color deviation is caused. Thus, this color does not require the conversion by the MCS processor 404 to reduce a color difference. Thus situation will be explained below specifically by way of an example in which the measured color space completely matches the device color space.

When the measured color space completely matches the device color space, the color signal (R=0, G=255, B=255) is converted by the ink color conversion processor to (C=255, M=0, Y=0, K=0). Single cyan (signal C) is already subjected to an appropriate density adjustment by the primary conversion of the HS processing. Thus, it is not preferable that cyan data is changed from the HS processing or other color data is added thereto. Specifically, in the case of the data as described above, the equivalence correction value to the first area and the second area may be $Z^{-1}[1]=Z^{-1}[2]=0=(0, 0, 0)$. The same applies to magenta-100% data (R=255, G=0, B=255). With regard to 100%-blue (R=0, G=, B=255), the data cannot be represented by a single color used in the printing apparatus and thus is represented by a combination of cyan ink and magenta ink. Thus, as already described with reference to FIGS. 3A to 3C, a color deviation may be caused even with the HS processing. Thus, in the example shown in FIG. 68, the following relations are established.

Equivalence correction value $Z^{-1}[1]=0=(0, 0, 0)$

Equivalence correction value $Z^{-1}[2]=T^{-1}[2]=(Rt-R2, Gt-G2, Bt-B2)\neq(0, 0, 0)$ Thus, an appropriate processing is performed by the MCS processing.

Figure 8:
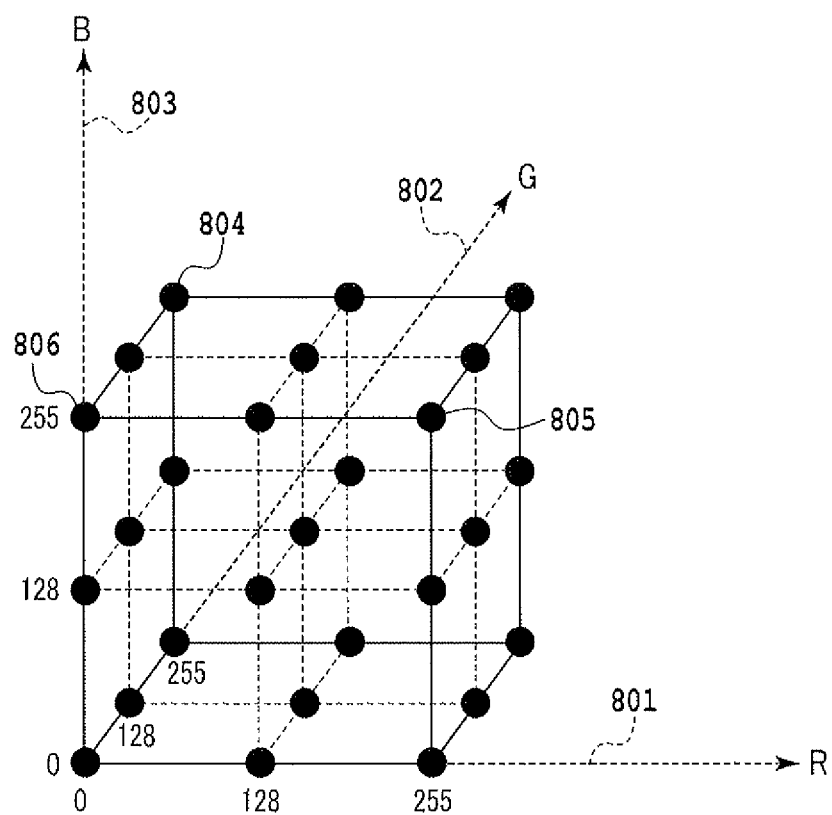
FIG. 8 illustrates lattice points having coordinates in an RGB space with an equal interval thereamong.

As described above, in the three dimensional space of RGB, lattice points requiring the MCS processing and lattice points not-requiring the MCS processing exist and the level of the correction is different depending on the signal value (positions of lattice points). Thus, when a color difference is desired to be suppressed in the entire color space, it is desired to prepare correction signal values for the MCS processing for all RGB values. However, when, for all combinations of RGB, patches are printed, color measurement are performed, correction value are calculated, and regions for printing the resultant correction value are prepared, the processing load is increased. This consequently causes the memory to have a higher capacity or an increased processing time. Thus, as in this embodiment, it is preferable that some colors particularly requiring the reduction of a color difference in the RGB space are selected and measurement image (patches) based on signal value corresponding to the color is printed. Then, the respective equivalence correction values are acquired to prepare a table. However, in the case where a color having a particularly high color difference is not limited, another form also may be used in which correction values are calculated with regard to the respective 27 lattice points corresponding to coordinates having an equal interval in the RGB space as shown in FIG. 8 for example. The important thing is to prepare table parameters based on correction values that are obtained by printing patches with regard to some specific color signals. By doing this, the image can be actually printed by subjecting a pluralities of dispersed pieces of parameter information to an interpolation processing to prepare parameters corresponding to the desired signal value.

Although the above-described method has been described as a method of preparing conversion table parameters by calculating a difference between the color measurement result of an actually-printed patch and the target color, the invention is not limited to this parameter generation method. For example, another method also may be used where, based on the color measurement of patches printed with regard to the respective lattice points shown in FIG. 8, the outline of the RGB color space represented by the printing apparatus is found and a signal value for realizing the target color is estimated and this estimated signal value is used as converted data. This will be specifically described below.

FIG. 8 shows an RGB color space. The reference numeral 801 denotes a red axis, the reference numeral 802 denotes a green axis, and the reference numeral 803 denotes a blue axis. The lattice points shown by the black circles are 27 lattice points having any of a component 0, a component 128, and a component 255 with regard to red, green, and blue. In this example, patches are printed based on the respective signal values of these 27 lattice points and the color measurement is performed for each area. The color obtained through the color measurement is called herein a device color (Ri, Gi, Bi). When the interpolation processing is performed based on the 27 device colors obtained from the 27 patches, the device color spaces for the respective areas are obtained. These device color spaces are different from the color space as shown in FIG. 8 configured by parallel straight lines having an equal interval thereamong and generally constitute color spaces having skewed outlines. When the device color spaces are used, the device color (Ri, Gi, Bi) for each area to all target colors (Rt, Gt, Bt) can be estimated. Alternatively, signal values (Rn, Gn, Bn) to be inputted in order to be maximally close to the target color (Rt, Gt, Bt) also can be calculated for the respective areas. Specifically, the device color spaces for the respective area as described above can be used to prepare such a table parameter that is used to convert the input signals (Rt, Gt, Bt) to (Rn, Gn, Bn).

MODIFICATION EXAMPLE 1

Figure 4B:
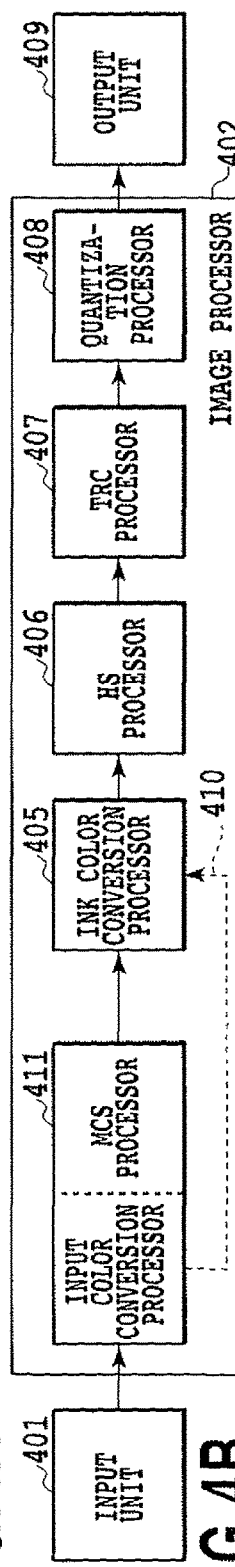

FIG. 4B is a block diagram illustrating another example of the configuration of the image processor in the ink jet printer according to this embodiment. In FIG. 4B, the respective components shown by the reference numerals 401 and 405 to 409 are the same as those shown by the same reference numerals in FIGS. 4A to 4D and thus will not be described further. Modification Example 1 is different from the configuration shown in FIG. 4A in that the processings by the input color conversion processor and the MCS processor are configured as an integrated processor as the first conversion means. Specifically, the input color conversion processing & MCS processor 411 of Modification Example 1 is a processor that has both of the input color conversion processing function and the MCS processing function.

Specifically, the input color conversion processing MCS processor 411 uses one table obtained by combining the table of the input color conversion processor and the table of the MCS processor. Then, the input image data from the input unit 401 can be directly subjected to a conversion processing for reducing a color difference, thus outputting device color image data having a reduced color difference.

Figure 9A:
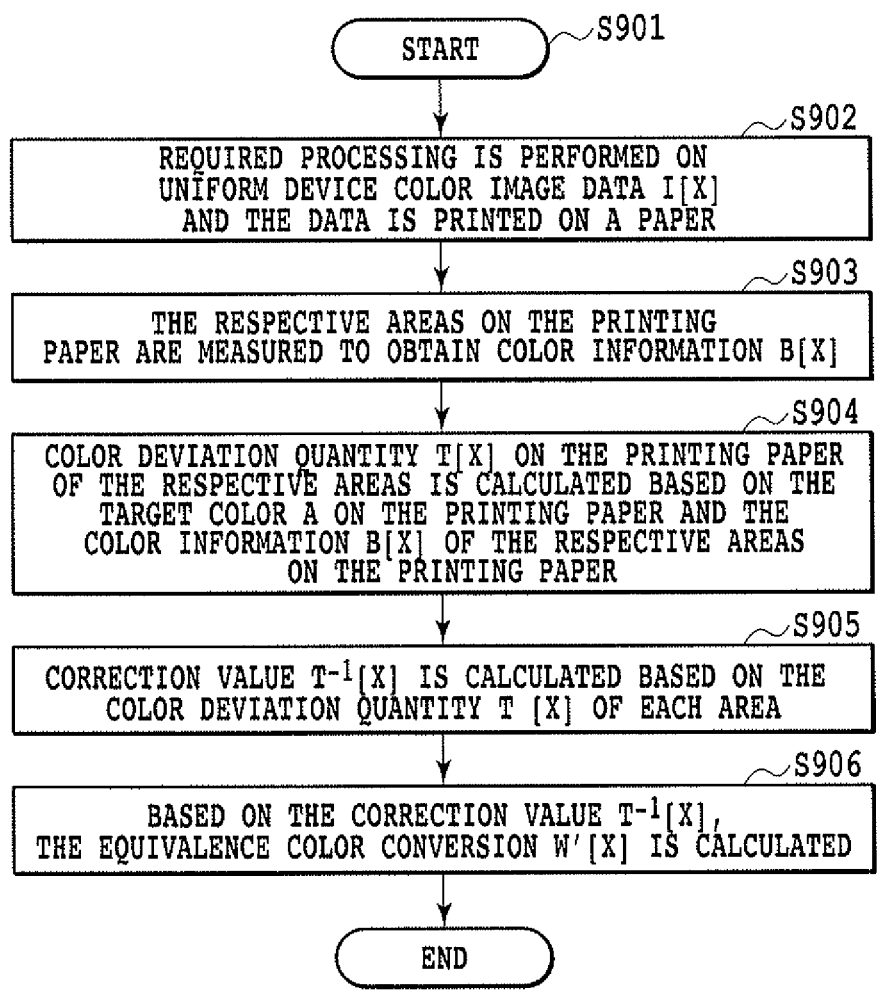
FIGS. 9A and 9B are flowcharts illustrating a processing for generating parameters for a conversion table according to Modification Example 1 and the MCS processing using the conversion table.
Figure 9B:
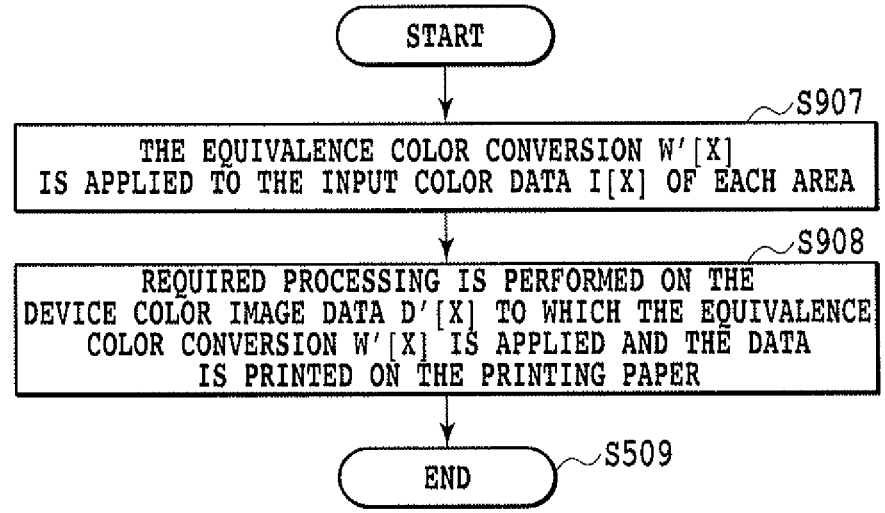

FIGS. 9A and 9B are flowcharts illustrating the processing for generating parameters of the table used by the input color conversion processing & MCS processor 411 and the MCS processing using the above table in the image processing for generating to-be-printed data, respectively.

FIG. 9A illustrates a processing performed by the CPU 311 to generate parameters for the three-dimensional look up table. This processing has the respective steps of Step S902 to Step S906. FIG. 9A is different from the flowchart of FIG. 5A in the processings in Step S902 and Step S906. These two processings will be described below.

In Step S902, based on the input color image data I[X] from the input unit 401, the measurement image for reducing a color difference is printed on the printing paper. During this, only the part corresponding to the input color conversion processor among the input color conversion processing & MCS processor 411 is allowed to function. Thus, the MCS processing is skipped by the bypass processing route shown by the broken line 410. Specifically, the input color conversion processing & MCS processor 411 is configured so that two tables can be switched. Specifically, with regard to the input image data I[X], a table combining the input color conversion processing with the processing by the MCS processor, that has color conversion W' (which will be described later) as a table parameter, and a table having a table parameter for only input color conversion processing are switched. Then, the measurement image is printed by switching to the table only for the input color conversion processing.

When the color conversion coefficient of the input color conversion processing by the table used for the printing of the measurement image is assumed as the input color conversion W, the relation of device color data D[X]=input color conversion W (input image data I[X]) is established. The uniform device color image data D[X] thus obtained is printed on the printing paper 106, as in the first embodiment, by the output unit 409 as a measurement image through the ink color conversion processor 405, the HS processor 406, the TRC processor 407, and the quantization processor 408.

In Step S906, the equivalence color conversion W'[X] as a table parameter is calculated based on the correction value $T^{-1}[X]$ for each area. This W'[X] is color conversion obtained by combining the input color conversion W with the equivalence color correction $Z^{-1}[X]$. The processing for calculating the equivalence color correction $Z^{-1}[X]$ is the same as that in the first embodiment and thus will not be described further.

FIG. 9B is a flowchart illustrating the steps by the input conversion & MCS processor 411 performed by the image processing accelerator 316 as a part of the processing of the image processor 402 shown in FIG. 4B in order to generate the data to be printed by the printer. Here, the color deviation correction is performed using the equivalence color conversion W'[X] as a table parameter prepared based on the flowchart of FIG. 9A. Specifically, the input color image data I[X] corresponding to each area is subjected to the color deviation correction and the device color image data D'[X] obtained through the color deviation correction is outputted. Then, the device color image data D'[X] is subjected to the processings of and after the ink color conversion processor 405 shown in FIG. 4B. Then, the image is printed by the output unit 409 on the printing paper.

According to Modification Example 1 as described above, since the equivalence color conversion W'[X] is fixed by Step S906 so that the device color image data D'[X] has the same value as that in the first embodiment, the color deviation can be reduced as in the first embodiment. Furthermore, since the color conversion $W^{-1}[X]$ which is made by combining of the equivalence color correction $Z^{-1}[X]$ and the input color conversion W is performed by using one lookup table, regions required for the lookup table can be reduced and the processing speed can be improved than in the case of the first embodiment.

MODIFICATION EXAMPLE 2

Figure 4C:
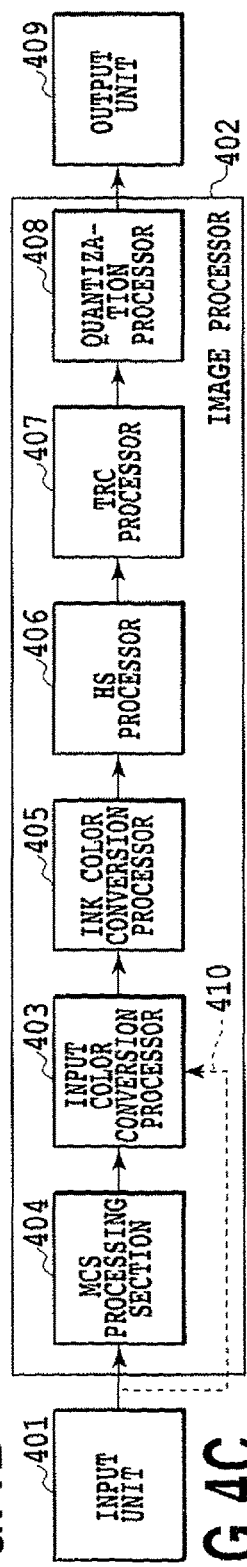

FIG. 4C is a block diagram illustrating the configuration of the image processor according to Modification Example 2 of this embodiment. Modification Example 2 is characterized in that the processing by the MCS processor 404 is performed prior to the processing by the input color conversion processor 403.

Figure 10A:
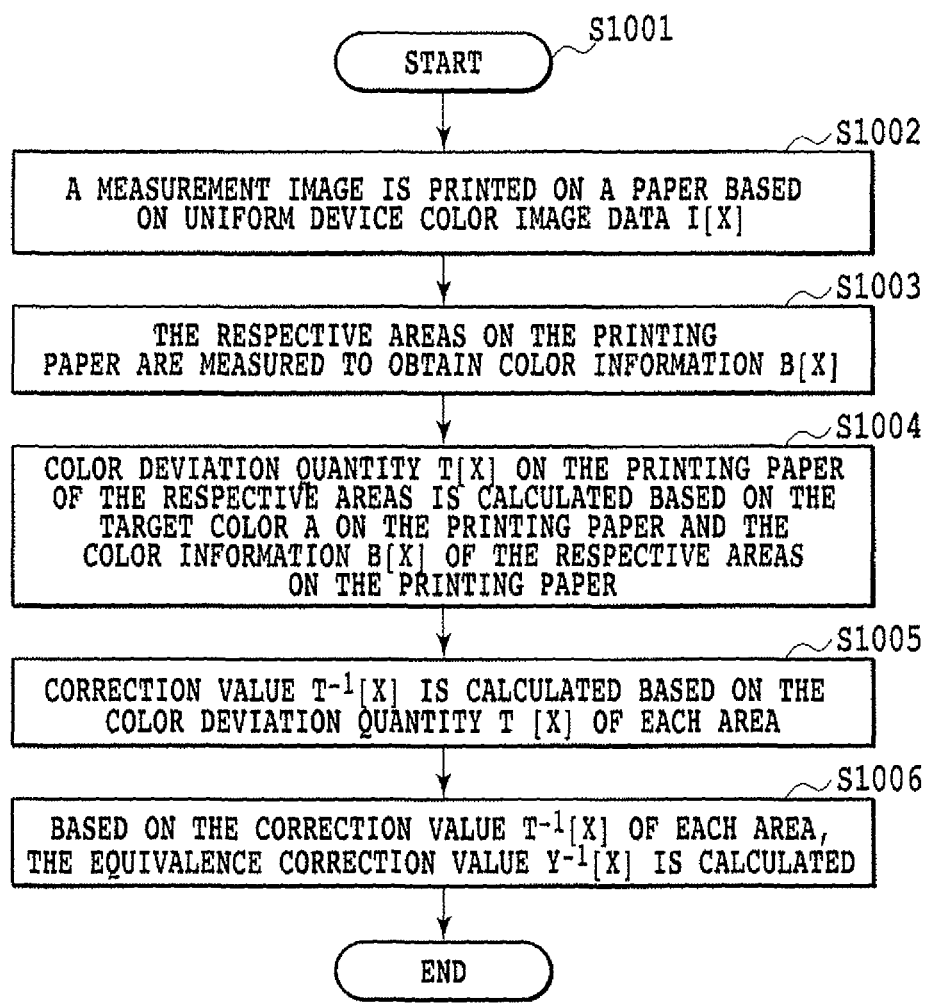
FIGS. 10A and 10B are flowcharts illustrating a processing for generating parameters for a conversion table according to Modification Example 2 and the MCS processing using the conversion table.
Figure 10B:
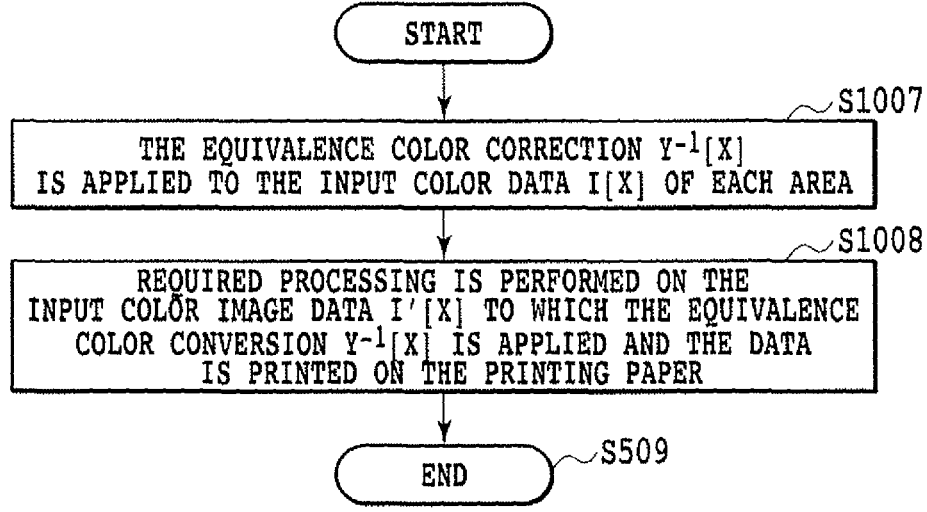

FIGS. 10A and 10B are flowcharts illustrating the processing according to Modification Example 2 for generating parameters used by the MCS processor 404 and the MCS processing using the table in the image processing for generating to-be-printed data, respectively. FIG. 10A is different from FIG. 5A in Step S1002 and Step S1006. Thus, these two processings will be described.

In Step S1002, the input color image data I[X] from the input unit 401 bypasses the MCS processor 404 and is converted by the input color conversion processor 403 to the device color D[X]. Thereafter, as in FIG. 4A, the measurement image is printed by the output unit 409 on the printing paper 106 through the ink color conversion processor 405, the HS processor 406, the TRC processor 407, and the quantization processor 408. Then, in step S1006, the equivalence correction value $Y^{-1}[X]$ for correcting the color of the input color space is calculated. This is a correction value to correct the input color and is equivalent to the equivalence correction value $Z^{-1}[X]$ calculated in Step S506 in the flowchart of FIG. 5A for correcting the color of the device color space. The processing for calculating the equivalence color correction value $Y^{-1}[X]$ is the same as that of FIG. 5A and thus will not be described further.

Next, the processing step of FIG. 10B will be described. In FIG. 10B, in Step S1007, the MOS processor 404 uses, with regard to the input color image data I[X] for each area, the table prepared in the processing S1010 to apply the equivalence correction value $Y^{-1}[X]$ to correct the data. Then, in Step S1008, the input color image data I'[X] which is corrected by the equivalence correction value $Y^{-1}[X]$ is converted by the input color conversion processor 403 to the device color image data D'[X]. The subsequent processings are the same as those of FIG. 5B and thus will not be described further.

According to Modification Example 2, the processing by the MCS processor 404 is performed prior to the processing by the input color conversion processor 403, thus providing more independent modules. For example, the MCS processor can be provided as an extended function to an image processor not provided. The processing also can be moved to the host PC side.

MODIFICATION EXAMPLE 3

Figure 4D:
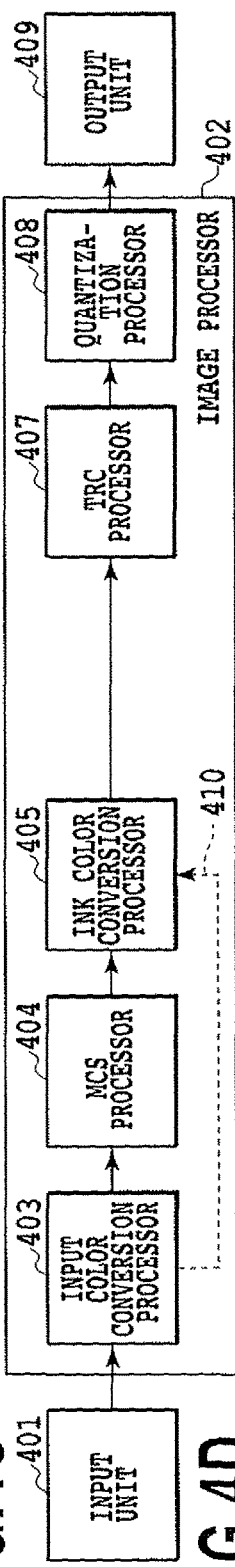

FIG. 4D is a block diagram illustrating the configuration of the image processor according to Modification Example 3. As in FIG. 4D, Modification Example 3 omits the KS processor 406 that was prepared in FIGS. 4A to 4C.

The generation of a table parameter for the MCS processor of Modification Example 3 and the processing by the MCS processor are the same as those of FIGS. 5A and 5B and are different in that the head shading by the processor is not performed. Specifically, in Modification Example 3, the table parameter of the MCS processor is not prepared based on the data obtained through the HS processing as in the above embodiment and Modification Examples. In Modification Example 3, based on the flowcharts shown in FIGS. 5A and 5B, the table parameter of the MCS processor can be generated and the image processing can be performed.

Figure 11A:
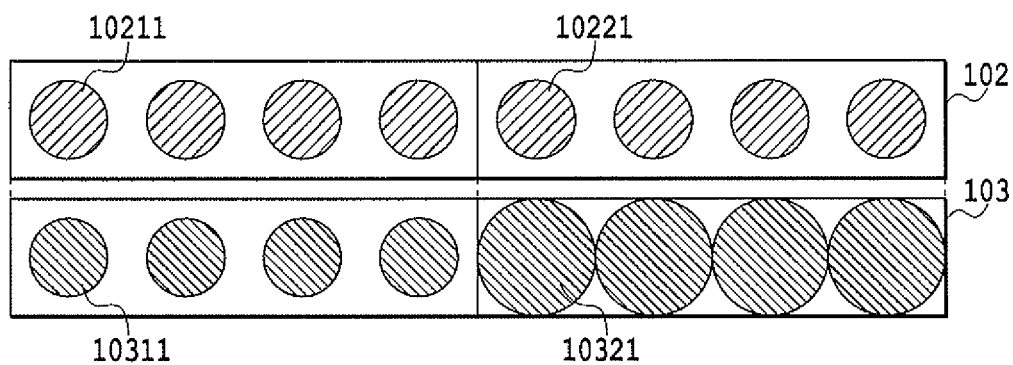
FIGS. 11A and 11B illustrate the printing status of the measurement image in Modification Example 3.
Figure 11B:
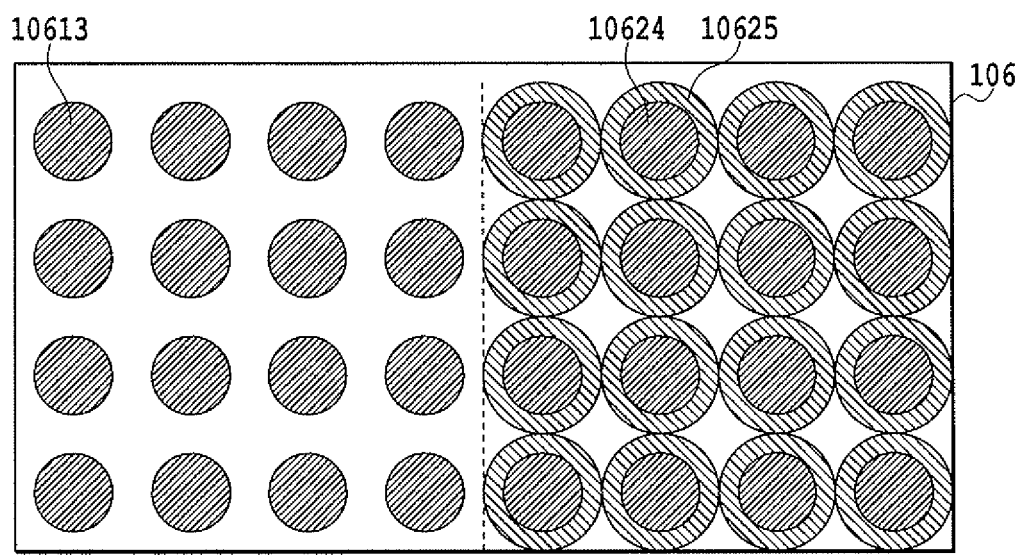

FIGS. 11A and 11B illustrate the printing status of the measurement image in Modification Example 3. As in the example shown in FIG. 3A, FIG. 11A shows an example in which four nozzles corresponding to the second area among the nozzles of the magenta printing head 103 have a greater-than-standard ejection volume. In Modification Example 3, the image data showing blue (K, C, M, Y)=(0, 255, 255, 0) is not subjected to the HS processing. Thus, the measurement image of blue as shown in FIG. 11B is printed. Specifically, even in the case of the second area including nozzles having a greater-than-standard ejection volume, magenta dots and cyan dots are printed in the same number. As a result, color deviation to magenta is caused in the second area.

When the patch as described above is subjected to the color measurement, the table parameter of the MCS processor 404 of Modification Example 3 has a correction value so as to reduce magenta. By performing the correction as described above, even in Modification Example 3 not including the HS processor, blue data can be printed to obtain the printing status as shown in FIG. 7B to thereby reduce the color difference.

Furthermore, in Modification Example 3 not including the HS processor, there is no need to prepare a table for the HS processing, thus eliminating the need for the processings for the HS processing such as "pattern printing", "color measurement", and "correction parameter computation". As a result, the memory can be reduced, thus reducing the time cost required for the HS processing.

The first embodiment and Modification Examples 1 to 3 thereof have been described above. However, the respective processing details are a mere example. Any configuration can be used so long as the configuration can reduce the color difference in the multi dimensional colors as in an effect of the present invention. For example, if a relative color difference among areas can be reduced, the color unevenness to be solved by the present invention is less conspicuous. Thus, a correction for making all areas to be close to the target color A as a fixed value is not always required. Specifically, the target color may be set so that the variation of the individual areas converges by setting the target color depending on the color tendency of the individual areas.

In the above embodiments, a nozzle array was divided to a pluralities of nozzle groups and one nozzle group was composed of four nozzles. A region defined by one nozzle group was defined as one area and was set as the minimum unit for performing the MCS processing. However, the present invention it not limited to the unit as described above. A region defined by more nozzles can be used as one unit or one nozzle also may be used as one nozzle group for the MCS conversion. Furthermore, the numbers of nozzles included in the individual areas do not always have to be the same number. Thus, the numbers of nozzles included in the individual areas may be appropriately set depending on the device characteristic. In a pluralities of nozzle arrays for ejecting a pluralities of inks, conversion tables may correspond to the respective combinations of nozzle groups for the printing on the same region on printing medium, respectively.

Furthermore, the above embodiments have described an example in which the image data inputted as a pluralities of elements of RGB was subjected to the MCS processing and then the data was converted to CMYK image data as color signals corresponding to a pluralities of ink colors used in the printing apparatus. However, the present invention is not limited to this. The image data to be subjected to the MCS processing may take, in addition to the RGB form, any form such as L*a*b*, Luv, LCbCr, or LCH.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-118669, filed May 24, 2010, which is hereby incorporated by reference herein in its entirety.

What is claimed is:

1. An image processor for printing an image on a first area of a printing medium by using a first nozzle group including a plurality of nozzles in a first nozzle array ejecting a first ink and a second nozzle group including a plurality of nozzles in a second nozzle array ejecting a second ink, and for printing an image on a second area different from the first area of the printing medium by using a third nozzle group including a plurality of nozzles different from the nozzles included in the first nozzle group in the first nozzle array and a fourth nozzle group including a plurality of nozzles different from the nozzles included in the second nozzle group in the second nozzle array, the image processor comprising:
- a first conversion unit configured to convert a first input color signal including RGB color components and representing a predetermined color to be printed on the first area into a first output color signal including RGB color components by using a first multi-color shading table corresponding to the first and second nozzle groups which defines a correspondence relationship between a combination of input values of the RGB color components of the first input color signal and a combination of output values of the RGB color components of the first output color signal, and convert a second input color signal including RGB color components and representing the predetermined color to be printed on the second area into a second output color signal including RGB color components by using a second multi-color shading table corresponding to the third and fourth nozzle groups which defines a correspondence relationship between a combination of input values of the RGB color components of the second input color signal and a combination of output values of the RGB color components of the second output color signal, wherein parameters for signal conversion that are defined by the first multi-color shading table and parameters for signal conversion that are defined by the second multi-color shading table, are different, wherein the first multi-color shading table and the second multi-color shading table are determined such that a color difference, which is caused by a variation of the ejecting characteristic among the nozzles of the first nozzle array and a variation of the ejecting characteristic among the nozzles of the second nozzle array, between a color of an image printed onto the first area by using the first nozzle group and the second nozzle group to eject the first ink and the second ink based on the first output color signal and a color of an image printed onto the second area by using the third nozzle group and the fourth nozzle group to eject the first ink and the second ink based on the second output color signal is reduced;
- a color conversion processing unit configured to convert RGB signal based on the first output color signal into a first multiple ink signal including an ink signal of the first ink representing an ink density of the first ink and an ink signal of the second ink representing an ink density of the second ink to be printed on the first area and convert RGB signal based on the second output color signal into second multiple ink signal ink signal of the first ink representing an ink density of the first ink and representing an ink signal of the second ink representing an ink density of the second ink to be printed on the second area;
- a second conversion unit configured to convert an input ink signal of the first ink representing an ink density of the first ink to be printed on the first area which is based on the first multiple ink signal into a output ink signal of the first ink using a first head shading table corresponding to the first nozzle group of the first nozzle array which defines correspondence relationship between an input value of the input ink signal of the first ink and an output value of the output ink signal of the first ink, and convert an input signal of the first ink representing an ink density of the first ink to be printed on the second area which is based on the first multiple ink signal into an output ink signal of the first ink using a second head shading table corresponding to the third nozzle group of the first nozzle array which defines correspondence relationship between an input value of the input ink signal of the first ink and an output value of the output ink signal of the first ink, the first head shading table and the second head shading table are determined such that a density difference, which is caused by a variation of the ejecting characteristic among the nozzles of the first nozzle array, between a density of an image printed onto the first area by ejecting the first ink only from the first nozzle group based on the output ink signal of the first ink and a density of an image printed onto the second area by ejecting the first ink only from the third nozzle group based on the output ink signal of the first ink is reduced, and configured to convert an input ink signal of the second ink representing an ink density of the second ink to be printed on the first area which is based on the second multiple ink signal into a output ink signal of the second ink using a third head shading table corresponding to the second nozzle group of the second nozzle array which defines correspondence relationship between an input value of the input ink signal of the second ink and an output value of the output ink signal of the second ink, and convert an input signal of the second ink representing an ink density of the second ink to be printed on the second area which is based on the second multiple ink signal into an output ink signal of the second ink using a fourth head shading table corresponding to the fourth nozzle group of the second nozzle array which defines correspondence relationship between an input value of the input ink signal of the second ink and an output value of the output ink signal of the second ink wherein the third head shading table and the fourth head shading table are determined such that a density difference, which is caused by a variation of the ejecting characteristic among the nozzles of the first nozzle array, between a density of an image printed onto the first area by ejecting the second ink only from the second nozzle group based on the output ink signal of the second ink and a density of an image printed onto the second area by ejecting the second ink only from the fourth nozzle group based on the output ink signal of the second ink is reduced; and
- a print data generating unit configured to generate print data used for printing on the first area and the second area by the first nozzle array based on the output ink signal of the first ink for the first area and output ink signal of the first ink for the second area converted by the second converting unit and print data used for printing on the first area and the second area by the second nozzle array based on the output ink signal of the second ink for the first area and output ink signal of the second ink for the second area converted by the second converting unit.

2. The image processor according to claim 1, wherein the first multi-color shading table and the second multi-color shading table are tables that have been generated based on a result of a color measurement of a multicolored measurement image that is printed by the first nozzle array and the second nozzle array using the first ink and second ink.

3. The image processor according to claim 2, further comprising: a color measurement unit configured to measure the multicolored measurement image printed to a color measurement.

4. The image processor according to claim 2, further comprising the first nozzle array and the second nozzle array.

5. The image processor according to claim 2, further comprising: a table generation unit configured to generate the first and second multi-color shading table based on the result of the color measurement.

6. The image processor according to claim 1, wherein the first nozzle group and the third nozzle group correspond to a predetermined number of nozzles of the first nozzle array and the second nozzle group and the fourth nozzle group correspond to the predetermined number of nozzles of the second nozzle array.

7. The image processor according to claim 1, wherein the color difference that is reduced by the first conversion unit is caused by a difference between a combination of an ejecting characteristic of the first nozzle group and an ejecting characteristic of the second nozzle group and a combination of an ejecting characteristic of the third nozzle group and an ejecting characteristic of the fourth nozzle group.

8. The image processor according to claim 7, wherein the ejecting characteristic of the first, second, third and fourth nozzle group indicates ejecting ink volume.

9. The image processor according to claim 1, wherein the first ink and second ink are any one of cyan ink, magenta ink, yellow ink or black ink respectively.

10. The image processor according to claim 1 further comprising a storage unit configured to storage the first multi-color shading table, the second multi-color shading table, the first head shading table, the second head shading table, the third head shading table and the fourth head shading table.

11. An image processing method for printing an image on a first area of a printing medium by using a first nozzle group including a plurality of nozzles in a first nozzle array ejecting a first ink and a second nozzle group including a plurality of nozzles in a second nozzle array ejecting a second ink, and for printing an image on a second area different from the first area of the printing medium by using a third nozzle group including a plurality of nozzles different from the nozzles included in the first nozzle group in the first nozzle array and a fourth nozzle group including a plurality of nozzles different from the nozzles included in the second nozzle group in the second nozzle array, the image processing method comprising:

a first conversion step for converting a predetermined first input color signal including RGB color components and representing a predetermined color to be printed on the first area into first output color signal including RGB color components by using a first multi-color shading table corresponding to the first and second nozzle groups which defines a correspondence relationship between a combination of input values of the RGB color components of the first input color signal and a combination of output values of the RGB color components of the first output color signal, and for converting a second input color signal including RGB color components and representing the predetermined color to be printed on the second area into a second output color signal including RGB color components by using a second multi-color shading table corresponding to the third and fourth nozzle group which defines a correspondence relationship between a combination of input values of the RGB color components of the second input color signal and a combination of output values of the second output color signal, wherein parameters for signal conversion that are defined by the first multi-color shading table and parameters for signal conversion that are defined by the second multi-color shading table, are different, wherein the first multi-color shading table and the second multi-color shading table are determined such that a color difference, which is caused by a variation of the ejecting characteristic among the nozzles of the first nozzle array and a variation of the ejecting characteristic among the nozzles of the second nozzle array, between a color of an image printed onto the first area by using the first nozzle group and the second nozzle group to eject the first ink and the second ink based on the first output color signal and a color of an image printed onto the second area by using the third nozzle group and the fourth nozzle group to eject the first ink and the second ink based on the second output color signal is reduced;

a color conversion step for converting RGB signal based on the first output color signal into a first multiple ink signal including an ink signal of the first ink representing an ink density of the first ink and an ink signal of the second ink representing an ink density of the second ink to be printed on the first area and converting RGB signal based on the second output color signal into second multiple ink signal ink signal of the first ink representing an ink density of the first ink and representing an ink signal of the second ink representing an ink density of the second ink to be printed on the second area;

a second conversion step for converting an input ink signal of the first ink representing an ink density of the first ink to be printed on the first area which is based on the first multiple ink signal into a output ink signal of the first ink using a first head shading table corresponding to the first nozzle group of the first nozzle array which defines correspondence relationship between an input value of the input ink signal of the first ink and an output value of the output ink signal of the first ink, and converting an input signal of the first ink representing an ink density of the first ink to be printed on the second area which is based on the first multiple ink signal into an output ink signal of the first ink using a second head shading table corresponding to the third nozzle group of the first nozzle array which defines a correspondence relationship between an input value of the input ink signal of the first ink and an output value of the output ink signal of the first ink, the first head shading table and the second head shading table are determined such that a density difference, which is caused by a variation of the ejecting characteristic among the nozzles of the first nozzle array, between a density of an image printed onto the first area by ejecting the first ink only from the first nozzle group based on the output ink signal of the first ink and a density of an image printed onto the second area by ejecting the first ink only from the third nozzle group based on the output ink signal of the first ink is reduced, and for converting an input ink signal of the second ink representing an ink density of the second ink to be printed on the first area which is based on the second multiple ink signal into a output ink signal of the second ink using a third head shading table corresponding to the second nozzle group of the second nozzle array which defines correspondence relationship between an input value of the input ink signal of the second ink and an output value of the output ink signal of the second ink, and converting an input signal of the second ink representing an ink density of the second ink to be printed on the second area which is based on the second multiple ink signal into an output ink signal of the second ink using a fourth head shading table corresponding to the fourth nozzle group of the second nozzle array which defines correspondence relationship between an input value of the input ink signal of the second ink and an output value of the output ink signal of the second ink wherein the third head shading table and the fourth head shading table are determined such that a density difference, which is caused by a variation of the ejecting characteristic among the nozzles of the first nozzle array, between a density of an image printed onto the first area by ejecting the second ink only from the second nozzle group based on the output ink signal of the second ink and a density of an image printed onto the second area by ejecting the second ink only from the fourth nozzle group based on the output ink signal of the second ink is reduced; and a print data generating step for generating print data used for printing on the first area and the second area by the first nozzle array based on the output ink signal of the first ink for the first area and output ink signal of the first ink for the second area converted by the second converting unit and print data used for printing on the first area and the second area by the second nozzle array based on the output ink signal of the second ink for the first area and output ink signal of the second ink for the second area converted by the second converting unit.

12. A printing apparatus comprising:

a printing unit configured to print an image on a printing medium conveyed in a conveying direction by using a first nozzle array in which a plurality of nozzles ejecting a first ink are arranged in a predetermined direction crossing to the conveying direction and a second nozzle array in which a plurality of nozzles ejecting a second ink are arranged in the predetermined direction: the first nozzle array and the second nozzle array being arranged in the conveying direction, wherein the printing unit prints an image on a first area of the printing medium by using a first nozzle group including a plurality of nozzles in the first nozzle array and a second nozzle group including a plurality of nozzles in the second nozzle array and prints an image on a second area different from the first area of the printing medium by using a third nozzle group including a plurality of nozzles different from the nozzles included in the first nozzle group in the first nozzle array and a fourth nozzle group including a plurality of nozzles different from the nozzles included in the second nozzle group in the second nozzle array;

a first conversion unit configured to convert a first input color signal including RGB color components and representing a predetermined color into a first output color signal including RGB color components according to a first multi-color shading table corresponding to the first and second nozzle groups which defines correspondence relationships between a combination of input values of the RGB color components of the first input color signal and a combination of output values of the RGB color components of the first output color signal, and which is set based on ejecting characteristics of the first nozzle group and the second nozzle group, and to convert a second input color signal including RGB color components and representing a predetermined color into a second output color signal including RGB color components according to a second multi-color shading table corresponding to the third and fourth nozzle groups which defines correspondence relationships between a combination of input values of the RGB color components of the second input color signal and a combination of output values of the RGB color components of the second output color signal, and which is set based on ejecting characteristics of the third nozzle group and the fourth nozzle group, wherein the first multi-color shading table and the second multi-color shading table are determined such that a color difference, which is caused by a variation of the ejecting characteristic among the nozzles of the first nozzle array and a variation of the ejecting characteristic among the nozzles of the second nozzle array, between a color of an image printed onto the first area by using the first nozzle group and the second nozzle group to eject the first ink and the second ink based on the first output color signal and a color of an image printed onto the second area by using the third nozzle group and the fourth nozzle group to eject the first ink and the second ink based on the second output color signal is reduced;

a color conversion processing unit configured to convert RGB signal based on the first output color signal into a first multiple ink signal including an ink signal of the first ink representing an ink density of the first ink and an ink signal of the second ink representing an ink density of the second ink to be printed on the first area and convert RGB signal based on the second output color signal into second multiple ink signal ink signal of the first ink representing an ink density of the first ink and representing an ink signal of the second ink representing an ink density of the second ink to be printed on the second area;

a second conversion unit configured to convert an input ink signal of the first ink representing an ink density of the first ink to be printed on the first area which is based on the first multiple ink signal into a output ink signal of the first ink according to a first head shading table corresponding to the first nozzle group of the first nozzle array which defines correspondence relationship between an input value of the input ink signal of the first ink and an output value of the output ink signal of the first ink, that is set based on ejecting characteristics of the first nozzle group and convert an input signal of the first ink representing an ink density of the first ink to be printed on the second area which is based on the first multiple ink signal into an output ink signal of the first ink according to a second head shading table corresponding to the third nozzle group of the first nozzle array which defines correspondence relationship between an input value of the input ink signal of the first ink and an output value of the output ink signal of the first ink, that is set based on ejecting characteristics of the third nozzle group, the first head shading table and the second head shading table are determined such that a density difference, which is caused by a variation of the ejecting characteristic among the nozzles of the first nozzle array, between a density of an image printed onto the first area by ejecting the first ink only from the first nozzle group based on the output ink signal of the first ink and a density of an image printed onto the second area by ejecting the first ink only from the third nozzle group based on the output ink signal of the first ink is reduced, and configured to convert an input ink signal of the second ink representing an ink density of the second ink to be printed on the first area which is based on the second multiple ink signal into a output ink signal of the second ink according to a third head shading table corresponding to the second nozzle group of the second nozzle array which defines correspondence relationship between an input value of the input ink signal of the second ink and an output value of the output ink signal of the second ink, that is set based on ejecting characteristics of the second nozzle group and convert an input signal of the second ink representing an ink density of the second ink to be printed on the second area which is based on the second multiple ink signal into an output ink signal of the second ink according to a fourth head shading table corresponding to the fourth nozzle group of the second nozzle array which defines correspondence relationship between an input value of the input ink signal of the second ink and an output value of the output ink signal of the second ink, that is set based on ejecting characteristics of the fourth nozzle group, wherein the third head shading table and the fourth head shading table are determined such that a density difference, which is caused by a variation of the ejecting characteristic among the nozzles of the first nozzle array, between a density of an image printed onto the first area by ejecting the second ink only from the second nozzle group based on the output ink signal of the second ink and a density of an image printed onto the second area by ejecting the second ink only from the fourth nozzle group based on the output ink signal of the second ink is reduced; and a controller constructed to control the printing unit to print an image on the first area and the second area by the first nozzle array based on the output ink signal of the first ink for the first area and output ink signal of the first ink for the second area converted by the second converting unit and print an image on the first area and the second area by the second nozzle array based on the output ink signal of the second ink for the first area and output ink signal of the second ink for the second area converted by the second converting unit.

13. An image processor for printing an image on a first area of a printing medium by using a first nozzle group including a plurality of nozzles in a first nozzle array ejecting a first ink and a second nozzle group including a plurality of nozzles in a second nozzle array ejecting a second ink, and for printing an image on a second area different from the first area of the printing medium by using a third nozzle group including a plurality of nozzles different from the nozzles included in the first nozzle group in the first nozzle array and a fourth nozzle group including a plurality of nozzles different from the nozzles included in the second nozzle group in the second nozzle array, the image processor comprising:

a first conversion unit configured to convert a first input color signal including RGB color components and representing a predetermined color to be printed on the first area into a first output color signal including RGB color components by using a first multi-color shading table corresponding to the first and second nozzle groups which defines a correspondence relationship between a combination of input values of the RGB color components of the first input color signal and a combination of output values of the RGB color components of the first output color signal, and convert a second input color signal including RGB color components and representing the predetermined color to be printed on the second area into a second output color signal including RGB color components by using a second multi-color shading table corresponding to the third and fourth nozzle group which defines a correspondence relationship between a combination of input values of the RGB color components of the second input color signal and a combination of output values of the RGB color components of the second output color signal, wherein parameters for signal conversion that are defined by the first multi-color shading table and parameters for signal conversion that are defined by the second multi-color shading table, are different, wherein the first multi-color shading table and the second multi-color shading table are determined such that a color difference, which is caused by a variation of the ejecting characteristic among the nozzles of the first nozzle array and a variation of the ejecting characteristic among the nozzles of the second nozzle array, between a color of an image printed onto the first area by using the first nozzle group and the second nozzle group to eject the first ink and the second ink based on the first output color signal and a color of an image printed onto the second area by using the third nozzle group and the fourth nozzle group to eject the first ink and the second ink based on the second output color signal is reduced;

a color conversion processing unit configured to convert RGB signal based on the first output color signal into a first multiple ink signal including an ink signal of the first ink representing an ink density of the first ink and an ink signal of the second ink representing an ink density of the second ink to be printed on the first area and convert RGB signal based on the second output color signal into second multiple ink signal ink signal of the first ink representing an ink density of the first ink and representing an ink signal of the second ink representing an ink density of the second ink to be printed on the second area; and a print data generating unit configured to generate print data used for printing on the first area and the second area by the first nozzle array based on the output ink signal of the first ink for the first area and output ink signal of the first ink for the second area converted by the second converting unit and print data used for printing on the first area and the and second area by the second nozzle array based on the output ink signal of the second ink for the first area and output ink signal of the second ink for the second area converted by the second converting unit.

* * * * *